United States Patent
Elston, III et al.

(10) Patent No.: US 9,122,788 B2
(45) Date of Patent: Sep. 1, 2015

(54) APPLIANCE NETWORK FOR A NETWORKED APPLIANCE WITH A NETWORK BINDER ACCESSORY

(75) Inventors: Wallace J. Elston, III, Paw Paw, MI (US); Anthony E. Jenkins, Stevensville, MI (US); Richard A. McCoy, Stevensville, MI (US); Michael A. Morrell, Hudsonville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 1437 days.

(21) Appl. No.: 11/929,995

(22) Filed: Oct. 30, 2007

(65) Prior Publication Data

US 2008/0123557 A1    May 29, 2008

Related U.S. Application Data

(63) Continuation-in-part of application No. PCT/US2006/022503, filed on Jun. 9, 2006.

(60) Provisional application No. 60/595,148, filed on Jun. 9, 2005.

(51) Int. Cl.
*H04L 12/28* (2006.01)
*G06F 11/34* (2006.01)
*G06F 9/54* (2006.01)
*H05B 6/68* (2006.01)
*H04L 29/06* (2006.01)
*H04L 29/08* (2006.01)

(52) U.S. Cl.
CPC .............. *G06F 11/3495* (2013.01); *G06F 9/54* (2013.01); *H04L 12/282* (2013.01); *H04L 12/2803* (2013.01); *H04L 67/12* (2013.01); *H04L 69/26* (2013.01); *H05B 6/688* (2013.01); *H04L 2012/285* (2013.01); *Y02B 40/143* (2013.01)

(58) Field of Classification Search
None
See application file for complete search history.

(56) References Cited

U.S. PATENT DOCUMENTS

| | | |
|---|---|---|
| 4,303,990 A | 12/1981 | Seipp |
| 4,345,132 A | 8/1982 | Takase et al. |
| 4,375,586 A | 3/1983 | Ueda |
| 4,480,307 A | 10/1984 | Budde et al. |
| 4,503,535 A | 3/1985 | Budde et al. |
| 4,520,576 A | 6/1985 | Vander Molen |
| 5,113,398 A | 5/1992 | Howes |
| 5,321,229 A | 6/1994 | Holling et al. |
| 5,517,622 A | 5/1996 | Ivanoff et al. |
| 5,520,576 A | 5/1996 | Wastell et al. |
| 5,609,786 A | 3/1997 | An |
| 5,710,409 A | 1/1998 | Schwarzbacker et al. |
| 5,754,548 A | 5/1998 | Hoekstra et al. |
| 5,839,097 A | 11/1998 | Klausner |
| 6,105,122 A | 8/2000 | Muller et al. |
| 6,121,593 A | 9/2000 | Mansbery et al. |
| 6,148,349 A | 11/2000 | Chow et al. |
| 6,243,772 B1 | 6/2001 | Ghori et al. |
| 6,295,272 B1 | 9/2001 | Feldman et al. |

(Continued)

FOREIGN PATENT DOCUMENTS

| | | |
|---|---|---|
| DE | 4038801 A1 | 6/1992 |
| DE | 19746423 A1 | 4/1999 |

(Continued)

*Primary Examiner* — Nicholas Sloms

(57) ABSTRACT

An appliance network has a network binder accessory to establish a private network among nodes that might be on different networks, using "one-click".

7 Claims, 28 Drawing Sheets

(56) References Cited

U.S. PATENT DOCUMENTS

| | | | |
|---|---|---|---|
| 6,426,947 B1 | 7/2002 | Banker et al. | |
| 6,453,687 B2 | 9/2002 | Sharood et al. | |
| 6,480,753 B1 | 11/2002 | Calder et al. | |
| 6,539,501 B1 | 3/2003 | Edwards | |
| 6,539,570 B2 | 4/2003 | Youn et al. | |
| 6,559,882 B1 | 5/2003 | Kerchner | |
| 6,587,739 B1 | 7/2003 | Abrams et al. | |
| 6,622,925 B2 | 9/2003 | Carner et al. | |
| 6,668,339 B1 | 12/2003 | Maeda | |
| 6,681,248 B1 | 1/2004 | Sears et al. | |
| 6,711,632 B1 | 3/2004 | Chow et al. | |
| 6,847,614 B2 | 1/2005 | Banker et al. | |
| 6,883,065 B1 | 4/2005 | Pittelkow et al. | |
| 6,919,815 B2 | 7/2005 | Peterson | |
| 6,934,592 B2 | 8/2005 | Hood et al. | |
| 6,948,098 B2 | 9/2005 | Pillay et al. | |
| 6,983,628 B2 | 1/2006 | Cho | |
| 6,996,115 B1 | 2/2006 | Budde et al. | |
| 6,996,741 B1 | 2/2006 | Pittelkow et al. | |
| 7,003,688 B1 | 2/2006 | Pittelkow et al. | |
| 7,043,663 B1 | 5/2006 | Pittelkow et al. | |
| 7,069,468 B1 | 6/2006 | Olson et al. | |
| 7,117,051 B2 | 10/2006 | Landry et al. | |
| 7,127,633 B1 | 10/2006 | Olson et al. | |
| 7,134,011 B2 | 11/2006 | Fung | |
| 7,136,927 B2 | 11/2006 | Traversat et al. | |
| 7,165,107 B2 | 1/2007 | Pouyoul et al. | |
| 7,171,475 B2 | 1/2007 | Weisman et al. | |
| 7,295,099 B2 | 11/2007 | Lee et al. | |
| 7,509,263 B1* | 3/2009 | Fiedotin et al. | 705/3 |
| 2001/0025392 A1 | 10/2001 | Youn et al. | |
| 2002/0120502 A1 | 8/2002 | Sakaguchi | |
| 2002/0161552 A1 | 10/2002 | Ryu | |
| 2003/0040813 A1 | 2/2003 | Gonzales et al. | |
| 2004/0031038 A1 | 2/2004 | Hugly et al. | |
| 2004/0057455 A1 | 3/2004 | Choi | |
| 2004/0060932 A1 | 4/2004 | Chun | |
| 2004/0098504 A1* | 5/2004 | Ueno et al. | 709/238 |
| 2004/0156170 A1 | 8/2004 | Mager et al. | |
| 2004/0172587 A1 | 9/2004 | Lawlor | |
| 2004/0260407 A1 | 12/2004 | Wimsatt | |
| 2005/0011886 A1 | 1/2005 | Kim | |
| 2005/0013310 A1 | 1/2005 | Banker et al. | |
| 2005/0018612 A1 | 1/2005 | Fitzgerald | |
| 2005/0103466 A1 | 5/2005 | Landry et al. | |
| 2005/0143129 A1* | 6/2005 | Funk et al. | 455/560 |
| 2005/0251604 A1 | 11/2005 | Gerig | |
| 2005/0258961 A1 | 11/2005 | Kimball et al. | |
| 2006/0009861 A1* | 1/2006 | Bonasia et al. | 700/18 |
| 2006/0015299 A1 | 1/2006 | McDermott et al. | |
| 2006/0092861 A1 | 5/2006 | Corday et al. | |
| 2006/0120302 A1 | 6/2006 | Poncini et al. | |
| 2006/0123124 A1 | 6/2006 | Weisman et al. | |
| 2006/0123125 A1 | 6/2006 | Weisman et al. | |
| 2006/0168159 A1 | 7/2006 | Weisman et al. | |
| 2006/0168269 A1 | 7/2006 | Sather et al. | |
| 2006/0184661 A1 | 8/2006 | Weisman et al. | |
| 2006/0190266 A1 | 8/2006 | Tanigawa et al. | |
| 2007/0129812 A1 | 6/2007 | Ferchau | |
| 2007/0129813 A1 | 6/2007 | Ferchau | |
| 2007/0160022 A1 | 7/2007 | McCoy et al. | |
| 2007/0288331 A1 | 12/2007 | Ebrom et al. | |
| 2007/0298405 A1 | 12/2007 | Ebrom et al. | |

FOREIGN PATENT DOCUMENTS

| | | |
|---|---|---|
| EP | 0802465 | 10/1997 |
| EP | 1016831 A1 | 7/2000 |
| EP | 1028604 A2 | 8/2000 |
| EP | 1351447 A1 | 10/2003 |
| JP | 58148316 | 9/1983 |
| JP | 6313561 | 11/1994 |
| JP | 2002074086 | 3/2002 |
| JP | 200249381 | 12/2002 |
| JP | 2004333079 | 11/2004 |
| KR | 10-2002-0006809 A | 1/2002 |
| KR | 10-2003-0035228 A | 5/2003 |
| KR | 10-2005-0066456 A | 6/2005 |
| KR | 10-2005-0068297 A | 7/2005 |
| WO | 2005109135 A1 | 11/2005 |
| WO | 2006014504 A2 | 2/2006 |
| WO | 2006135726 A2 | 12/2006 |
| WO | 2006135758 A1 | 12/2006 |

* cited by examiner

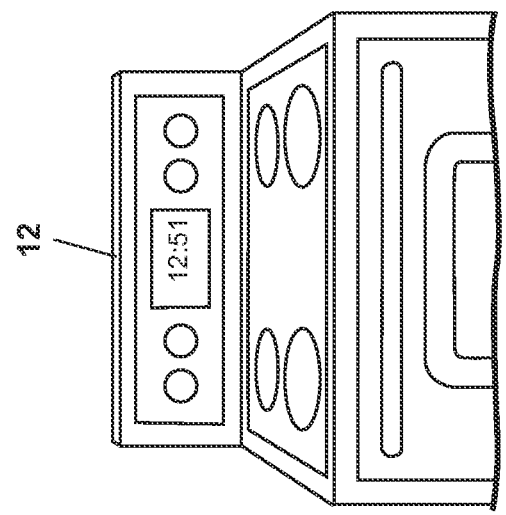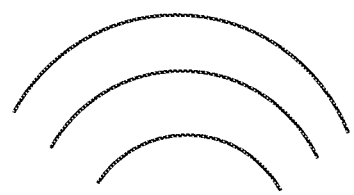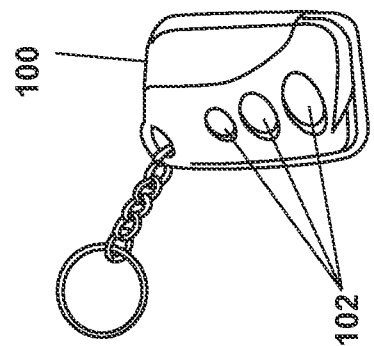
Fig. 16

APPLIANCE NETWORK FOR A NETWORKED APPLIANCE WITH A NETWORK BINDER ACCESSORY

CROSS-REFERENCE TO RELATED APPLICATION

This application is a continuation-in-part of International Application No. PCT/US2006/022503, filed Jun. 9, 2006, which claims the benefit of U.S. Provisional Patent Application No. 60/595,148, filed Jun. 9, 2005, both of which are incorporated by reference.

BACKGROUND OF THE INVENTION

1. Field of the Invention

The invention relates to components and accessories for a communicating appliance.

2. Description of the Related Art

Household appliances typically comprise one or more components responsible for the electromechanical operations of the appliance. For example, an oven can include an appliance management component having a printed circuit board (PCB) with memory, as well as a user-interface component, such as a control panel or keypad, for a user to issue commands to the oven. As another example, a washing machine can include an appliance management component, a user-interface component, and a motor control component that controls a motor of the washing machine.

Typically, discrete circuits couple the internal components of an appliance, with each discrete circuit responsible for individual communication between related components. The circuits communicate with each other over an internal network that traditionally is implemented by hard-wired ribbon cables or other connectors or harnesses between the components. The hard-wired connectors form a closed system or network that is difficult or not possible to modify. For example, because the closed network relies on hard-coded or hard-wired network solutions, it is not practical to couple additional external components or additional internal components to the appliance to expand the capability or function of the appliance. The closed network cannot easily be adapted for communication with the additional external/internal components and therefore limits the potential of the appliance.

SUMMARY OF THE INVENTION

A network binder accessory can bind a first node to one or more other nodes in a private network apart from any existing network to which the first and other nodes may belong. The network binder accessory includes a processor, memory, and a power source to energize the processor and the memory. Also included is a wireless transmitter/receiver of limited transmission range in communication with the processor and memory, and an actuator to actuate the wireless transmitter/receiver, with the processor and memory in communication with a node by way of the wireless transmitter/receiver only when the node is within the limited transmission range of the actuated wireless transmitter/receiver. The network binder accessory is external to the first and other nodes. Upon actuation of the actuator when the first node is within the limited transmission range of the wireless transmitter/receiver, the network binder accessory recognizes any existing network identifiers associated with the first node. The processor and memory operate to establish a new private network identifier, apart from any existing network identifiers, and the new private network identifier is communicated with and assigned to the first node via the wireless transmitter/receiver. Upon actuation of the actuator when the another node is later within the limited transmission range of the wireless transmitter/receiver, the wireless transmitter/receiver transmits the new private network identifier to the other node to bind the first and other nodes to each other using the new private network identifier. In this manner the private network with the first and other nodes is established apart from any existing network to which the first and other nodes may belong.

BRIEF DESCRIPTION OF THE DRAWINGS

In the drawings:

FIG. 16 is a schematic view of a network binder according to one embodiment of the invention for use with a communicating appliance.

DESCRIPTION OF EMBODIMENTS OF THE INVENTION

Figure 1:
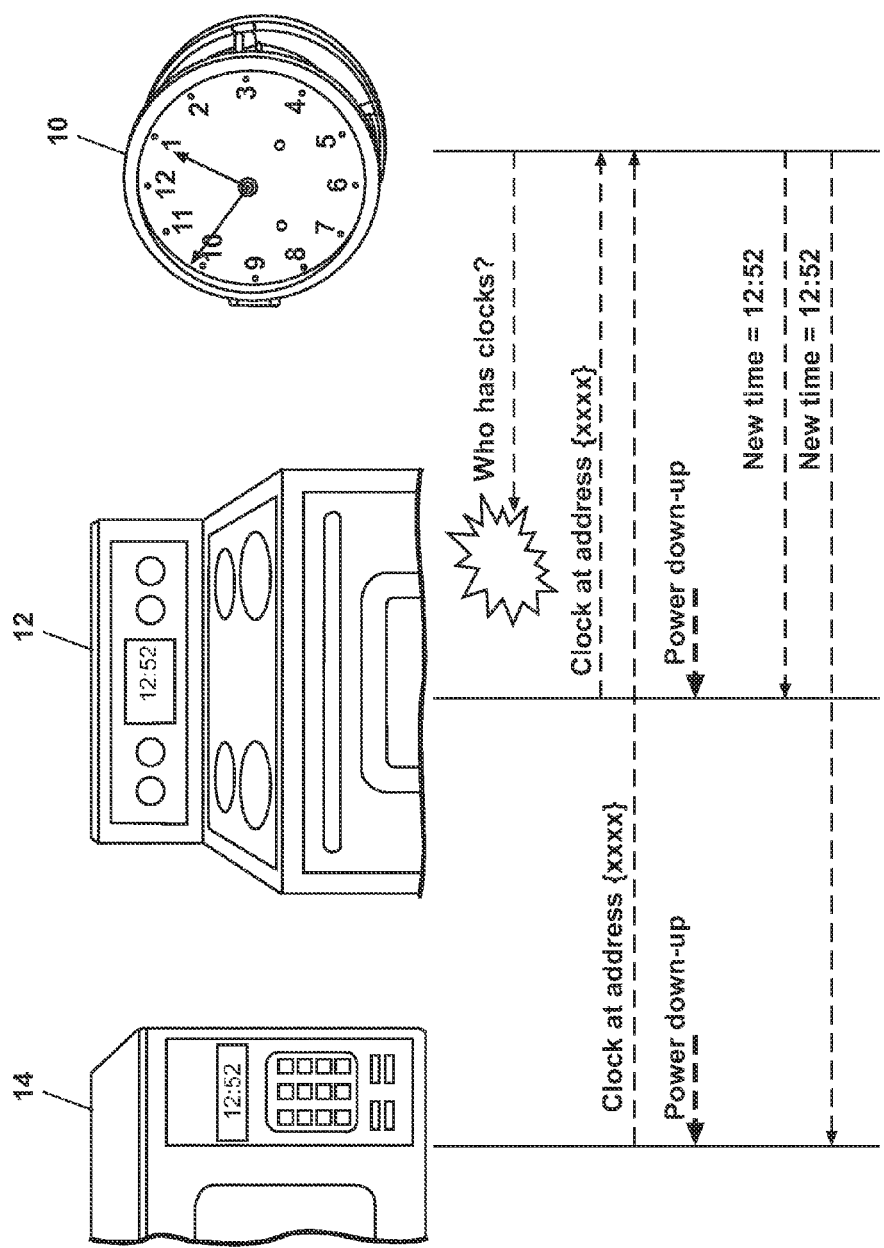
FIG. 1 is a schematic view of a clock accessory for a communicating appliance according to one embodiment of the invention, wherein the clock communicates a time to appliances following powering the appliances down and up.

By employing a software architecture that enables facile communication between internal components of an appliance and between an external component and one or more of the internal components of the appliance, various components and accessories can communicate with the appliance to expand the capability, functionality, and usability of the appliance. The appliance can be any suitable appliance, such as a household appliance. Examples of household appliances include, but are not limited to, clothes washing machines, clothes dryers, ovens, dishwasher, refrigerators, freezers, microwave ovens, trash compactors, and countertop appliances, such as waffle makers, toasters, blenders, mixers, food processors, coffee makers, and the like.

The appliance can be configured to perform a cycle of operation to complete a physical domestic operation on an article. Examples of the physical domestic operations include a food preparation operation, a food preservation operation, a fluid treatment operation, a cleaning operation, a personal care operation, a fabric treatment operation, an air treatment operation, and a hard surface treatment operation. The air treatment operation can comprise, for example, air purification, air humidification, air dehumidification, air heating, and air cooling. The food preparation operation can comprise, for example, food cleaning, food chopping, food mixing, food heating, food peeling, and food cooling. The food preservation operation can comprise, for example, food cooling, food freezing, and food storage in a specialized atmosphere. The fluid treatment operation can comprise, for example, fluid heating, fluid boiling, fluid cooling, fluid freezing, fluid mixing, fluid whipping, fluid dispensing, fluid filtering, and fluid separation. The cleaning operation can comprise, for example, dishwashing, fabric washing, fabric treatment, fabric drying, hard surface cleaning, hard surface treatment, hard surface drying, carpet cleaning, carpet treatment, and carpet drying. The personal care operation can comprise, for example, hair treatment, nail treatment, body massaging, teeth cleaning, body cleaning, and shaving.

The internal components of the appliances can include any component that participates in the operation of the appliance. Some of the internal components have a corresponding controller (main controller, motor controller, user interface, etc.), which can be a simple microprocessor mounted on a printed circuit board, and other components that have no controller. The components can comprise one or more devices that are controlled by the controller. Typically, the controller components in cooperation, either directly or indirectly, through other components, control the operation of all of the components and the associated devices to implement an operation or cycle for the appliance.

The software architecture can be implemented on and communicated over an internal communications network on the appliance. The internal communications network connects the various internal components of the appliance and can be considered a closed network. One example of the internal communications network used within the appliance is the WIDE network protocol, created by Whirlpool, Inc., the assignee of the present patent application.

The software architecture expands the communication ability of the appliance by effectively creating an open network, hereinafter referred to as "network." Within the appliance, the software architecture can, but does not have to, reside on each of the components that have a controller. Those components with the software architecture form a network node that can communicate with the other nodes.

The software architecture can perform multiple functions. For example, one function can relate to identifying each of the components corresponding to a node on the network, while another function can relate to identifying capabilities or functions of the identified components on the network. Yet another exemplary function is to identify the status of the components on the network. In this way, the software architecture can function to inform all of the nodes on the network of the presence, capabilities, and status of the other nodes.

The software architecture can comprise multiple modules, each of which has different functionality. Various combinations of the modules or all of the modules can reside on each of the components. One module having a basic or core functionality resides on all of the components. In one anticipated configuration, all of the modules reside at least on the main controller, which establishes the main controller to function as a primary or main software architecture, with the other nodes functioning in a client relationship to the main software architecture. In such a configuration, all of the nodes can communicate through the main software architecture. The software architecture can be sufficiently robust that it can permit configurations without a main software architecture or with multiple main software architectures. For example, the controllers of the various components can work together to control the operation of the appliance without any one of the appliances functioning as a main controller. Regardless of the configuration, any component with the software architecture can function as a client with respect to the other components.

Because of the software architecture, the internal components of the appliance are not only connected with one another, but the internal components can also be connected to one or more external components or a new internal component through the network. The external component and/or the new internal component has one, some, or all of the software architecture modules in resident. As a result, the external component and/or the new internal component can communicate with the internal components of the appliance and can also communicate with other external components having the software architecture.

The software architecture can be any suitable software architecture that enables communication between the internal components of the appliance and the external component and/or the new internal component or between components external to the appliance. An example of the software architecture is disclosed in Patent Cooperation Treaty Patent Application No. PCT/US2006/022420, titled "SOFTWARE ARCHITECTURE SYSTEM AND METHOD FOR COMMUNICATION WITH, AND MANAGEMENT OF, AT LEAST ONE COMPONENT WITHIN A HOUSEHOLD APPLIANCE," filed Jun. 8, 2006, and incorporated herein by reference in its entirety. A related example is shown in priority document U.S. Patent Application No. 60/595,148, filed Jun. 9, 2005. All of the communications between components and accessories and/or any combination of components and accessories described in this application can be implemented by the software and network structures disclosed in either of these applications.

The software architecture disclosed in the aforementioned references can be implemented by providing one or more of the software elements of the software architecture at least on each of the components to be controlled and on the accessory. The software architecture is configured to generate a plurality of messages, with at least one of the software elements residing in each of the components and in the accessory and configured to enable transmission of at least one of the plurality of messages between the components and between the accessory and the components. The messages can be transmitted for bi-directional communication between components and/or components and accessory. The messages can include command messages that are used to implement a physical domestic operation cycle of the appliance.

The messages can be generated by a message generator, which can take the form of the software architecture, the accessory, or a component. One possible message generator is a user interface.

Descriptions of several examples of components and accessories, herein after referred to as "accessory" with it being understood that the accessory can be considered a component on the network, for use in conjunction with the appliance having the software architecture follow. The accessories can be external to the appliance or internal to the appliance. Each of the accessories is enabled with the software architecture whereby the accessory establishes a node on the network or is part of an existing node on the network.

One example of the accessory is a clock. In one embodiment, the clock is external to the appliance and is an atomic clock. For example, the atomic clock can be a wireless atomic clock that can communicate with one or more of the appliances. An illustration of this embodiment is shown in FIG. 1, where a clock 10 can communicate with a first appliance 12 in the form of an oven and a second appliance 14 in the form of a microwave oven.

The clock can acquire an official time via any suitable method, such as from a cellular network, a radio network, or the Internet. The clock can then transmit the official time to the appliance(s). For example, the clock can automatically transmit the official time, transmit the official time based on registered time events (i.e., transmit the official time at predetermined intervals to appliances that have registered for the time events), or transmit the official time upon request from one or more of the appliances.

An example of transmitting the time is shown in FIG. 1. The clock 10 communicates with the first and second appliances 12, 14 on the network and asks for identification of the appliances that have clocks. The first and second appliances 12, 14 both respond by informing the clock 10 that the first appliance 12 and the second appliance 14 each have a clock and provide corresponding addresses for the respective clocks. An event occurs where the first and second appliances 12, 14 are powered down (i.e., off) and up (i.e., on) such that the time on the first and second appliances 12, 14 is no longer set. The clock 10 then transmits the official time to the clocks of each of the first and second appliances 12, 14, and the clock 10, the first appliance 12, and the second appliance 14 all display the same official time.

Figure 2:
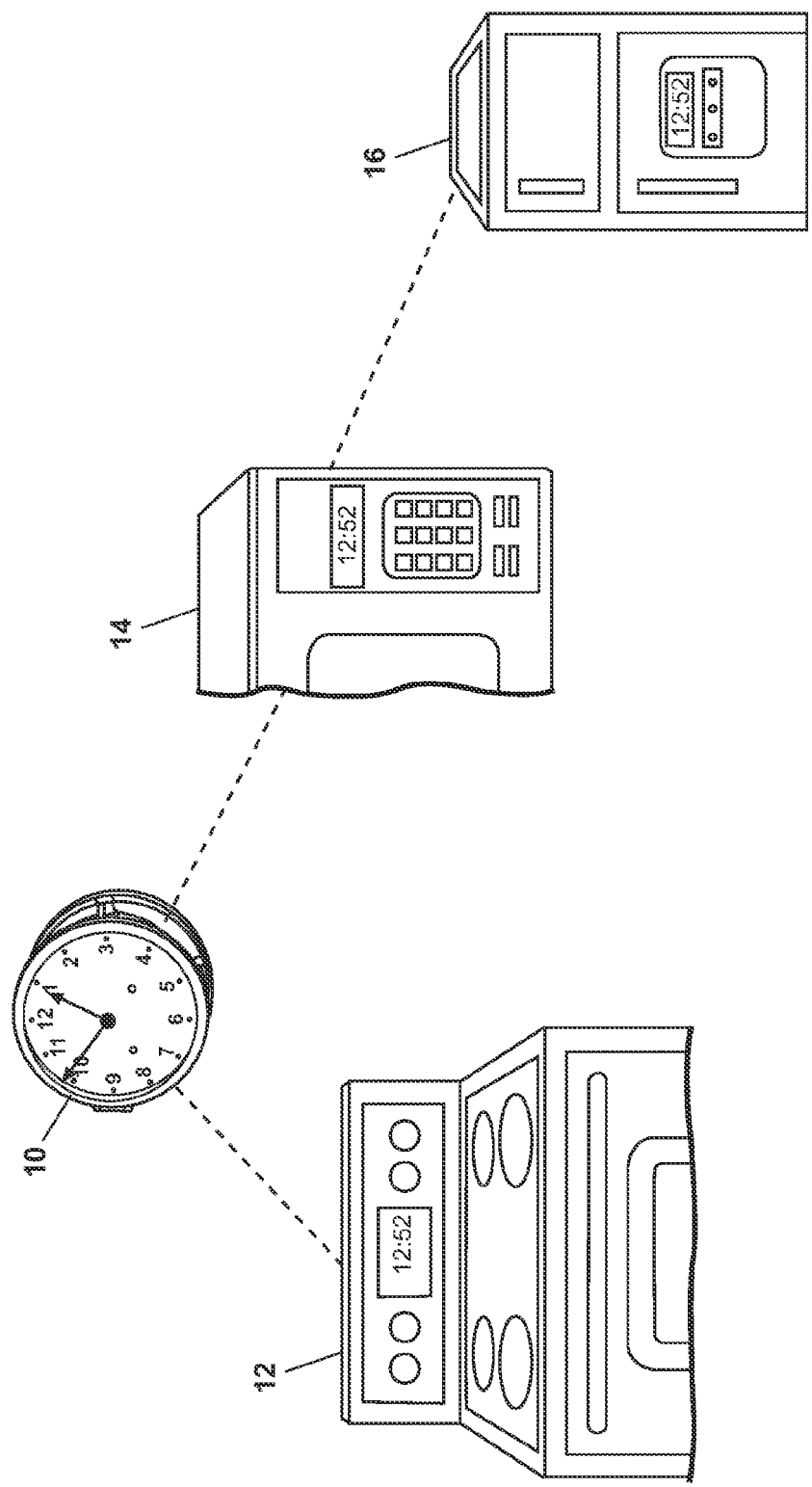
FIG. 2 is a schematic view of a clock accessory for a communicating appliance according to another embodiment of the invention, wherein the clock functions as an amplifier and/or a wireless access point.

The clock can also function as an amplifier to boost a signal provided by the appliance to a destination appliance or as a wireless access point that can transmit a signal provided by the appliance to a destination appliance. For example, the appliance can have a radio that is not sufficiently strong to provide visibility to the destination appliance but is strong enough to provide visibility to the clock. The clock can receive the signal from the appliance and re-broadcast the signal to a destination appliance or to another appliance that can transmit the signal to the destination appliance, and so on. The clock can amplify the signal prior to or while re-broadcasting the signal, or the clock can simply re-broadcast the signal. An example of utilizing the clock in this manner is illustrated in FIG. 2. The first appliance 12 in the form of the oven has visibility to the clock 10 and sends a signal to the clock 10. The clock 10 can optionally amplify the signal before or while re-broadcasting the signal to the second, destination appliance 14 in the form of the microwave oven. In another scenario, where the destination appliance is a third appliance 16 in the form of a refrigerator, the second appliance 14 can send the signal to the third appliance 16.

The clock can optionally serve as a protocol bridge. A protocol is a standard procedure for regulating data transmission between devices; however, not all devices necessarily communicate in the same protocol. A bridge effectively translates one protocol into another so that devices with different protocols can communicate with one another. The clock, therefore, can function not only as a time-keeping apparatus but also as a bridge between appliances or between the appliance and another device. Thus, the bridge functionality can be incorporated into the clock and the user does not need to purchase a separate bridge. The amplifier and bridging functions can also be included in any of the other accessories described below.

Figure 3:
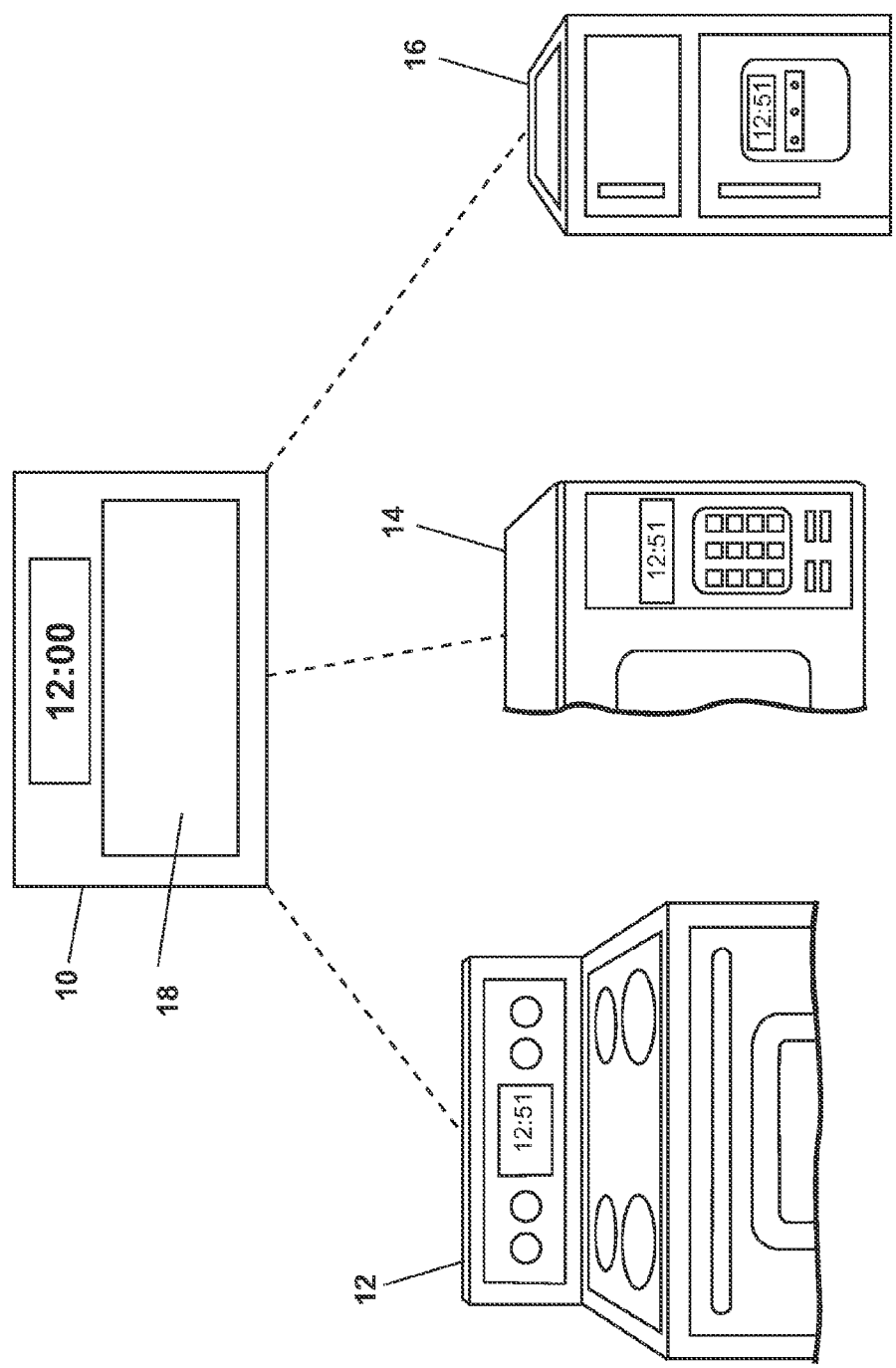
FIG. 3 is a schematic view of a clock accessory for a communicating appliance according to another embodiment of the invention, wherein the clock comprises a display for communication with a user of the communicating appliance.

Referring now to FIG. 3, the clock 10 that communicates with the appliance(s) 12, 14, 16, can include a display 18 for communication with the user. The display 18 can be integrated with a time display or can be separate from the time display. As examples, the display 18 can be a liquid crystal display (LCD), a plasma display, a digital display, and the like. The display 18 can communicate to the user a status of the appliance, such as via one or more notification icons. Examples of appliance status include, but are not limited to, laundry washing complete, laundry drying complete, laundry off balance, microwave food defrosted, turn defrosting food in microwave, microwave food ready, oven pre-heat complete, oven food ready, boil over on cooktop, fire, hot water ready, and coffee ready. The relevant notification icons can become illuminated, such as by flashing or being constantly illuminated, or otherwise visible when appropriate and become un-illuminated or otherwise not visible when appropriate.

The clock 10 can further have the capability of communicating to the user, such as via the display 18, an alert status of the appliance(s) 12, 14, 16 with which the clock 10 communicates, and, optionally, the user can acknowledge receipt of the alert status, such as via the display 18. According to one embodiment, the acknowledgement by the user can clear the alert status from the clock 10 and the appliance(s) 12, 14, 16. In this manner, the display 18 can function as a user interface that effects communication not only to the user from the appliance but also from the user to the appliance.

With continued reference to FIG. 3, the clock 10 can optionally incorporate appliance control capability whereby the user can provide control inputs or commands to the appliance(s) 12, 14, 16 through the clock 10, such as via the display 18. Exemplary commands include, but are not limited to, start/stop wash cycle, start/stop drying cycle, start/stop cooking program, decrease heating element power for simmer, execute low heat tumble following drying cycle, decrease microwave heating power, increase temperature of chill zone in refrigerator, and the like.

If the clock on the network does not have electronics for functioning as an atomic clock, the clock can be a satellite clock that can receive time from an atomic clock enabled to speak "TimeCast" protocol. Thus, the clock can display the time given by the atomic clock through TimeCast.

The clock can be internal to the appliance, as described above, or can be external to the appliance. When the clock is internal to the appliance, electronics for the clock can be packaged into the appliance during manufacture of the appliance or can be installed into the appliance as an after-market accessory. The clock as an internal accessory can have any of the functionalities described above for the external clock. The clock can also be "plugged" into an appropriate connector on the appliance. The connector can provide both power and data communication.

Figure 4:
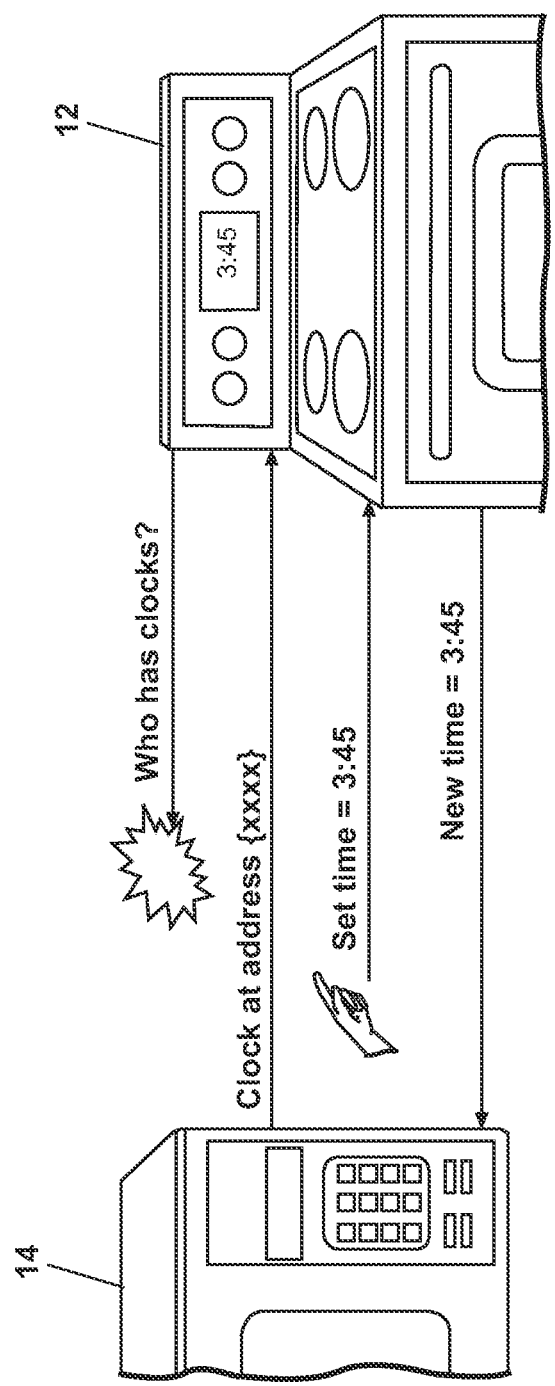
FIG. 4 is a schematic view of a clock accessory for a communicating appliance according to another embodiment of the invention, wherein the clock communicates a time to other appliances to synchronize the time among the appliances.

The clock conventionally associated with the appliance can also function as an accessory. For example, the clock of the appliance can communicate with clocks of other appliances, such as for synchronization of the clocks to establish and/or maintain consistent time among all of the appliances. An example of clock synchronization is illustrated in FIG. 4. The first appliance 12 broadcasts a message requesting identification of appliances having clocks. The second appliance 14 responds by informing the first appliance 12 that the second appliance 14 has a clock and provides an address for the clock. Thus, the first appliance 12 has established the appliances that have clocks. In the future, the user can set the time on the first appliance 12, and the first appliance 12 can then broadcast the set time to the appliances that have clocks, such as the second appliance 14. Alternatively, the user can set the time on the clock of another appliance, which can transmit the set time to the first appliance 12 and the second appliance 14. As a result of this process, the user need only set the time on one of the appliances as the clocks of the other appliances automatically synchronize with the clock having the set time. Such a configuration can be especially beneficial in situations, such as a power outage, where multiple clocks on the appliances lose power and, therefore, the time.

Figure 5:
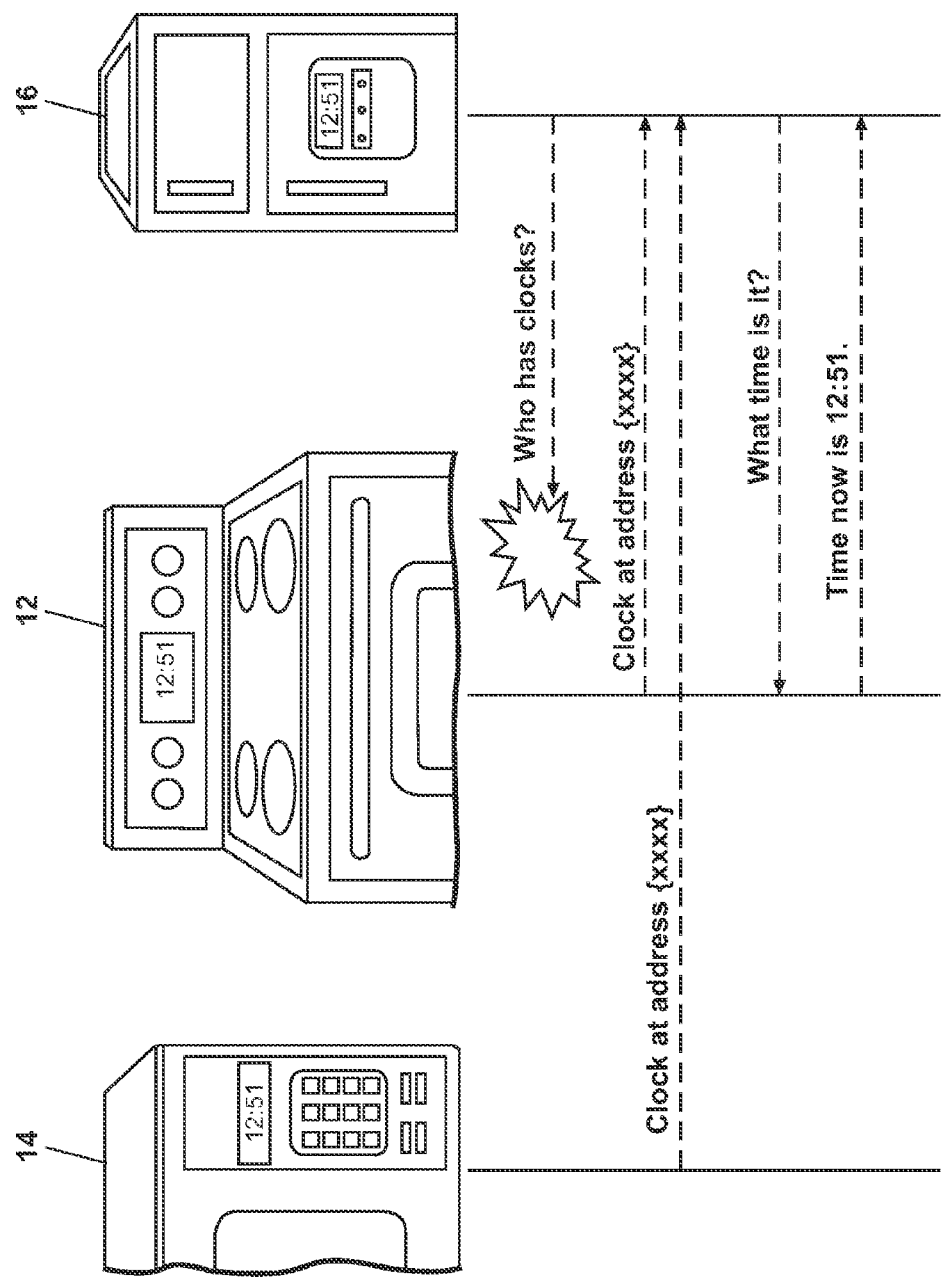
FIG. 5 is a schematic view of a clock accessory for a communicating appliance according to another embodiment of the invention, wherein the clock on one appliance requests a time from a clock on another appliance to synchronize the time among the appliances.

Another example of clock synchronization is shown schematically in FIG. 5. In this example, the appliance requests the time from another appliance. The third appliance 16 broadcasts a message requesting identification of appliances having clocks. The first appliance 12 responds by informing the third appliance 16 that the first appliance 12 has a clock and provides an address for the clock. Similarly, the second appliance 14 responds by informing the third appliance 16 that the second appliance 14 has a clock and provides an address for the clock. Thus, the third appliance 16 has established the appliances that have clocks. The third appliance 16 then communicates with at least one of the appliances having a clock, which is shown as the first appliance 12 in FIG. 5, and requests the time from the first appliance 12. The first appliance 12 responds by providing the time to the third appliance 16. Alternatively, the third appliance 16 can request the time from another of the appliances, such as the second appliance 14.

The clocks of the appliances can also synchronize by one of the appliances broadcasting the time at periodic intervals. When the clocks are synchronized in this manner, each minute rollover of the time can be synchronized so that there is no discrepancy between the times on the clocks, even while the displayed time is changing.

Another example of an accessory is a cooking aid. The cooking aid can be an active accessory, a sensing accessory, or a combination thereof. The active accessory can be programmed by the user or can receive commands from the appliance for performing an action. The sensing accessory can include one or more sensors that detects a state of the accessory and/or appliance and communicates the state to the appliance or other component on the network.

Figure 6:
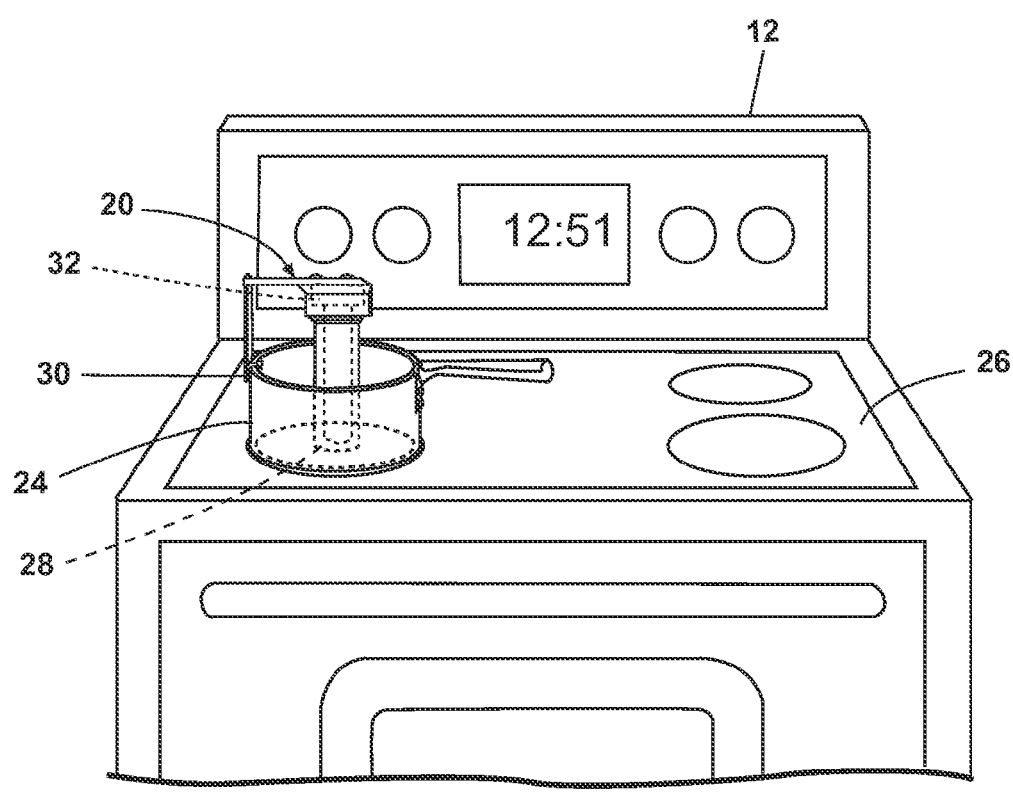
FIG. 6 is a schematic view of a cooking aid accessory in the form of a controlled stirrer according to one embodiment of the invention for use with a communicating appliance.

Exemplary active cooking aids include a controlled stirrer 20 and an ingredient dispenser 22, which can both be associated with the first appliance 12 in the form of the oven. As shown in FIG. 6, the controlled stirrer 20 can be coupled to a cooking vessel 24, such as a pot or pan, located on a cooktop 26 of the first appliance 12. Alternatively, the controlled stirrer 20 can be coupled to the first appliance 12, such as to the cooktop 26, rather than to the cooking vessel 24. The controlled stirrer 20 includes a stirring mechanism 28, such as an auger, that can induce movement of material (i.e., food) within the cooking vessel 24, and a mount 30 for coupling the stirring mechanism 28 to the cooking vessel 24 or the first appliance 12. The controlled stirrer 20 has a controller 32 that can communicate with the cooktop 26 or other part of the first appliance 12 for receiving stirring commands. The commands can be associated with a recipe, such as a recipe stored within the first appliance 12 or a recipe otherwise visible to the first appliance 12, such as via another component on the network. Alternatively, the user can program the controlled stirrer 20 according to desired actions or a recipe. The stirring commands can include information such as start stirring, stop stirring, stirring speed, and stirring frequency. In an alternative embodiment, the controlled stirrer 20 can be integrated with the cooking vessel 24. Regardless of the configuration of the controlled stirrer 20, employing the controlled stirrer 20 eliminates or reduces the need for the user to be present at the second appliance 12 to stir the material in the cooking vessel 24. The controlled stirrer 20 is especially beneficial when a recipe requires continuous stirring of the material for a relatively long period of time.

Figure 7:
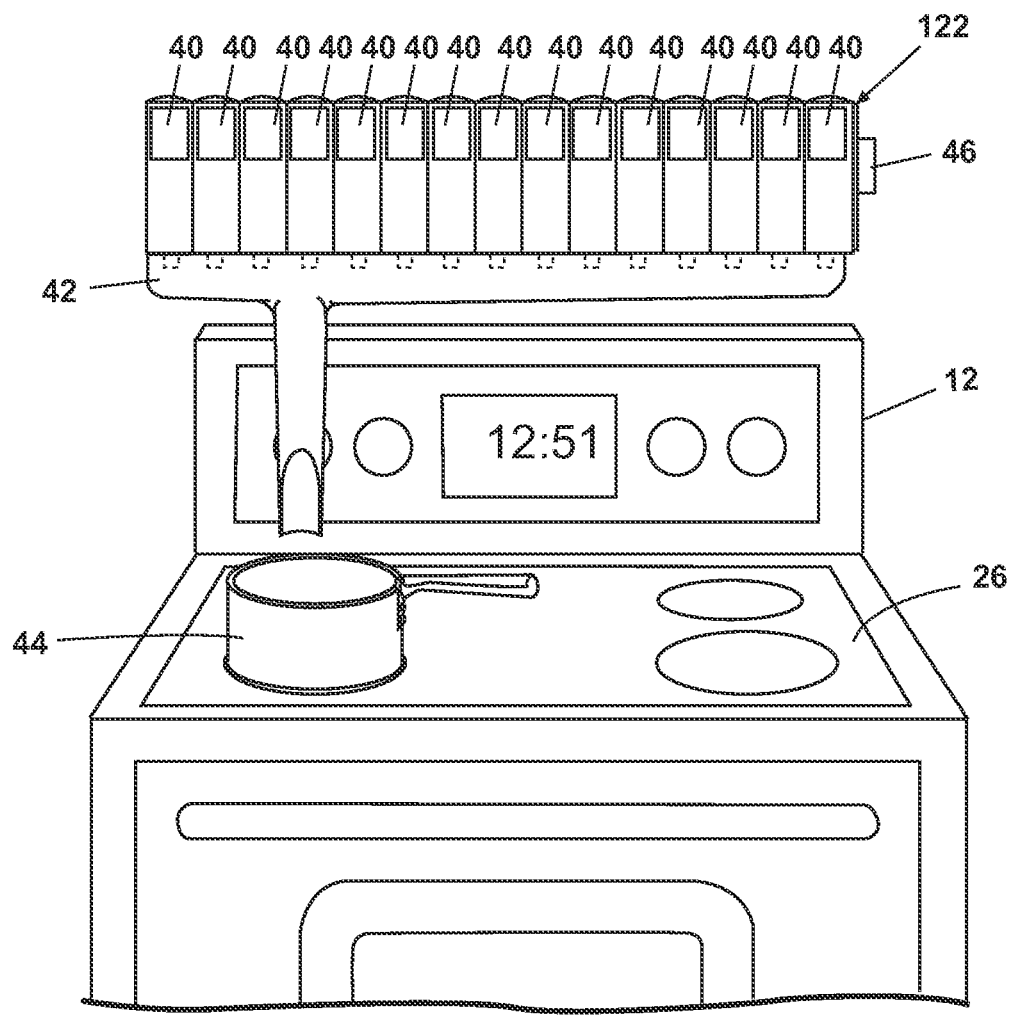
FIG. 7 is a schematic view of a cooking aid accessory in the form of an ingredient dispenser according to one embodiment of the invention for use with a communicating appliance.

Referring now to FIG. 7, the ingredient dispenser 24 can be mounted to or located in the vicinity of the first appliance 12 and can include one or more compartments 40 configured to store ingredients. The compartments 40 couple with corresponding dispensing mechanisms 42 configured to transport the ingredients from the compartments 40 to a cooking vessel 44, such as a pot or pan. The cooking vessel 44 can be intended for use on the cooktop 26 or inside the first appliance 12. The ingredient dispenser 24 further includes a controller 46 that can communicate with the first appliance 12 for receiving commands related to dispensing the ingredients. The commands can be associated with a recipe, such as a recipe stored within the first appliance 12 or a recipe otherwise visible to the first appliance 12, such as via another component on the network. Alternatively, the user can program the ingredient dispenser 24 according to desired actions or a recipe. The commands related to dispensing the ingredients can include information such as when to add an ingredient and the amount of the ingredient to be added.

The ingredient dispenser 24 can be provided to the user with the ingredients in the compartments 40 (i.e., pre-filled compartments) or with the compartments 40 in an empty condition whereby the user must supply the ingredients to the compartments 40. When the compartments 40 are pre-filled, the type and amount of ingredients can correspond to a predetermined recipe. In one embodiment, the ingredient dispenser 24 can include replaceable compartments so that the user can insert compartments 40 that correspond to a desired recipe.

Employing the ingredient dispenser 24 provides several advantages. For example, the ingredient dispenser can accurately measure and dispense the ingredients at the proper time during the preparation of the material in the cooking vessel 44, thereby improving the quality of the resulting food. Additionally, the ingredient dispenser 24 eliminates or reduces the need for the user to be present at the first appliance 12 for dispensing the ingredients.

Figure 8:
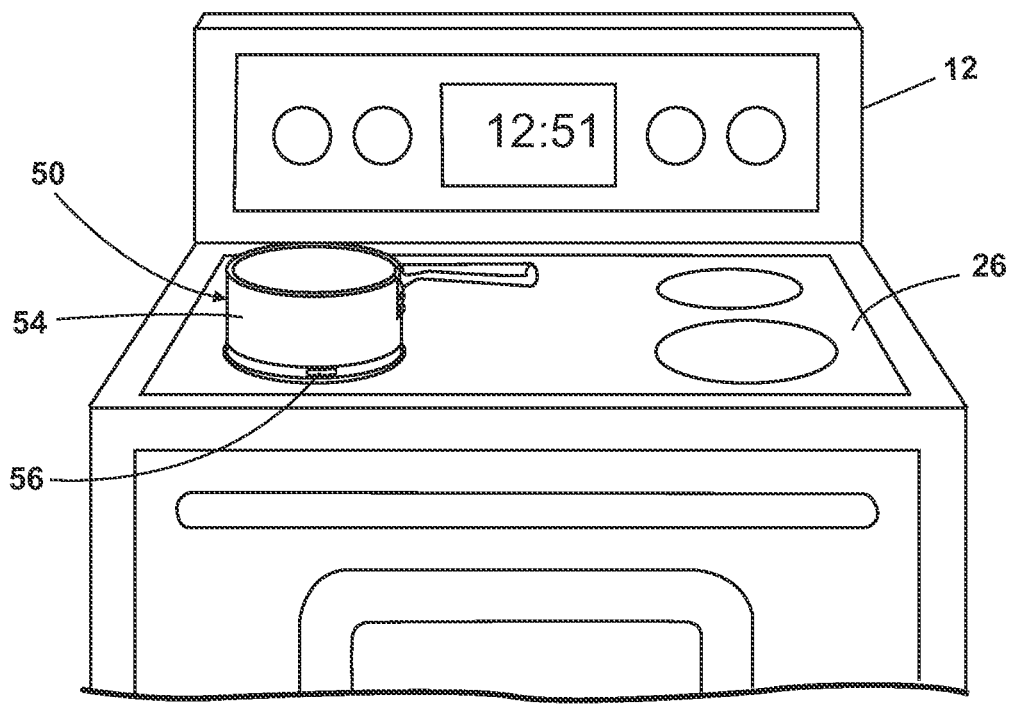
FIG. 8 is a schematic view of a cooking aid accessory in the form of a sensing cooking vessel according to one embodiment of the invention for use with a communicating appliance.

Exemplary sensing cooking aids include a sensing cooking vessel 50 and a removable cooking vessel sensor 52, which can both be associated with the first appliance 12 in the form of the oven. As shown in FIG. 8, the sensing cooking vessel 50 comprises a cooking vessel 54 and a sensor 56 that can detect a condition of the cooking vessel 54. The cooking vessel 54 can be any suitable type of cooking vessel, such as a pot or a pan. The sensor 56 can be, for example, a temperature sensor, a timer, a combination temperature sensor/timer, a sound sensor, a humidity sensor, a vision sensor, and a motion detector. The sensor can be integrated with the cooking vessel 54 or otherwise coupled with the cooking vessel 54. The sensor 56 can communicate with the first appliance 12, such as with the cooktop 26, or other component on the network to communicate the sensed condition of the cooking vessel 54. For example, the sensed condition can be boiling, boiling over, simmering, current temperature, boiling time, simmering time, time above a certain temperature, and temperature as a function of time (i.e., heating curve). The first appliance 12 can be configured to respond to the sensed condition of the cooking vessel 54, such as by increasing heat, decreasing heat, and increasing or decreasing time at a certain temperature. The response by the first appliance 12 can be in accordance with a recipe or with instructions programmed by the user. The sensing cooking vessel 50 thereby provides a means for closed loop temperature control between the cooking vessel 54 and the first appliance 12.

In the case of a vision sensor, the sensor could transmit video to anther device for the consumer. The consumer could then make control function decisions including control adjustments or stirring activation, as the case may be.

Figure 9:
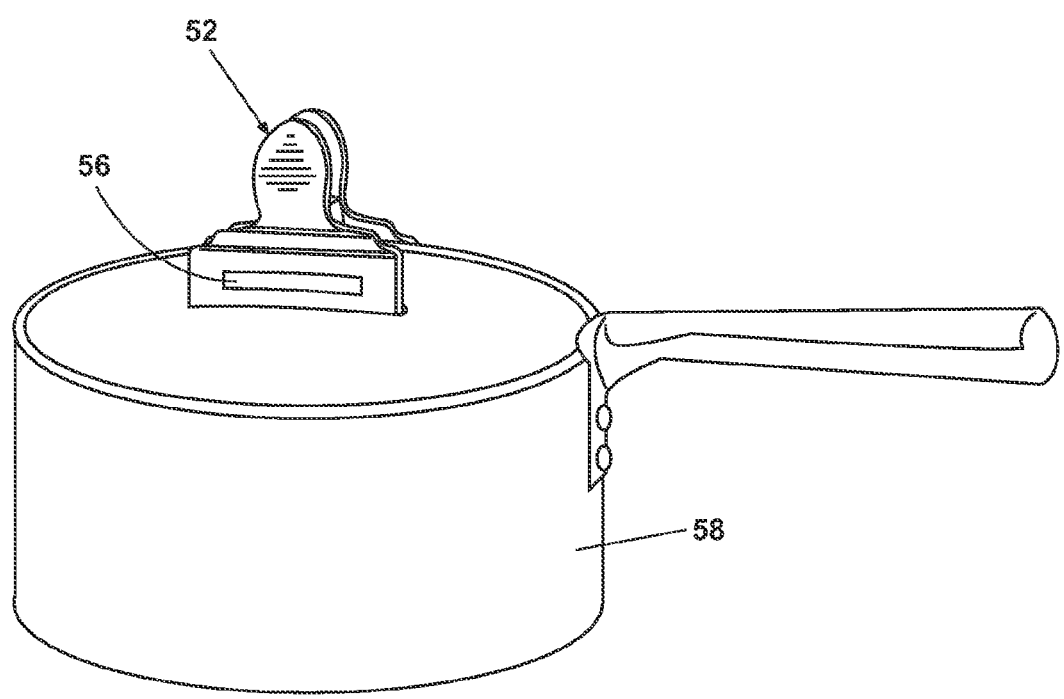
FIG. 9 is a schematic view of a cooking aid accessory in the form of a removable cooking vessel sensor according to one embodiment of the invention for use with a communicating appliance.

The functionality of the sensing cooking vessel 50 can alternatively be accomplished with the removable cooking vessel sensor 52. Referring now to FIG. 9, the removable cooking vessel sensor 52 is an accessory that can be removably coupled to a conventional cooking vessel 58 and comprises the sensor 56 described above with respect to the sensing cooking vessel 50. The removable cooking vessel sensor 52 can have any suitable form, such as a clip, as shown in FIG. 9, that removably clips onto the cooking vessel 58. Employing the removable cooking vessel sensor 52 eliminates the need for the user to purchase a special cooking vessel having the sensor 56; rather, the removable cooking vessel sensor 52 can be used with any cooking vessel as it can effectively add the sensor 56 to any cooking vessel.

The exemplary cooking aids described above, the controlled stirrer 20, the ingredient dispenser 22, the sensing cooking vessel 50, and the removable cooking vessel sensor 52, can be employed individually or in combination with one another. Each of the cooking aids 20, 22, 50, 52 provides a degree of automation to the cooking process, and using more than one of the cooking aids increases the degree of automation. When the user employs more than one of the cooking aids 20, 22, 50, 52, the cooking aids 20, 22, 50, 52 can optionally communicate with each other in addition to communicating with the first appliance 12 or other component on the network.

Figure 10:
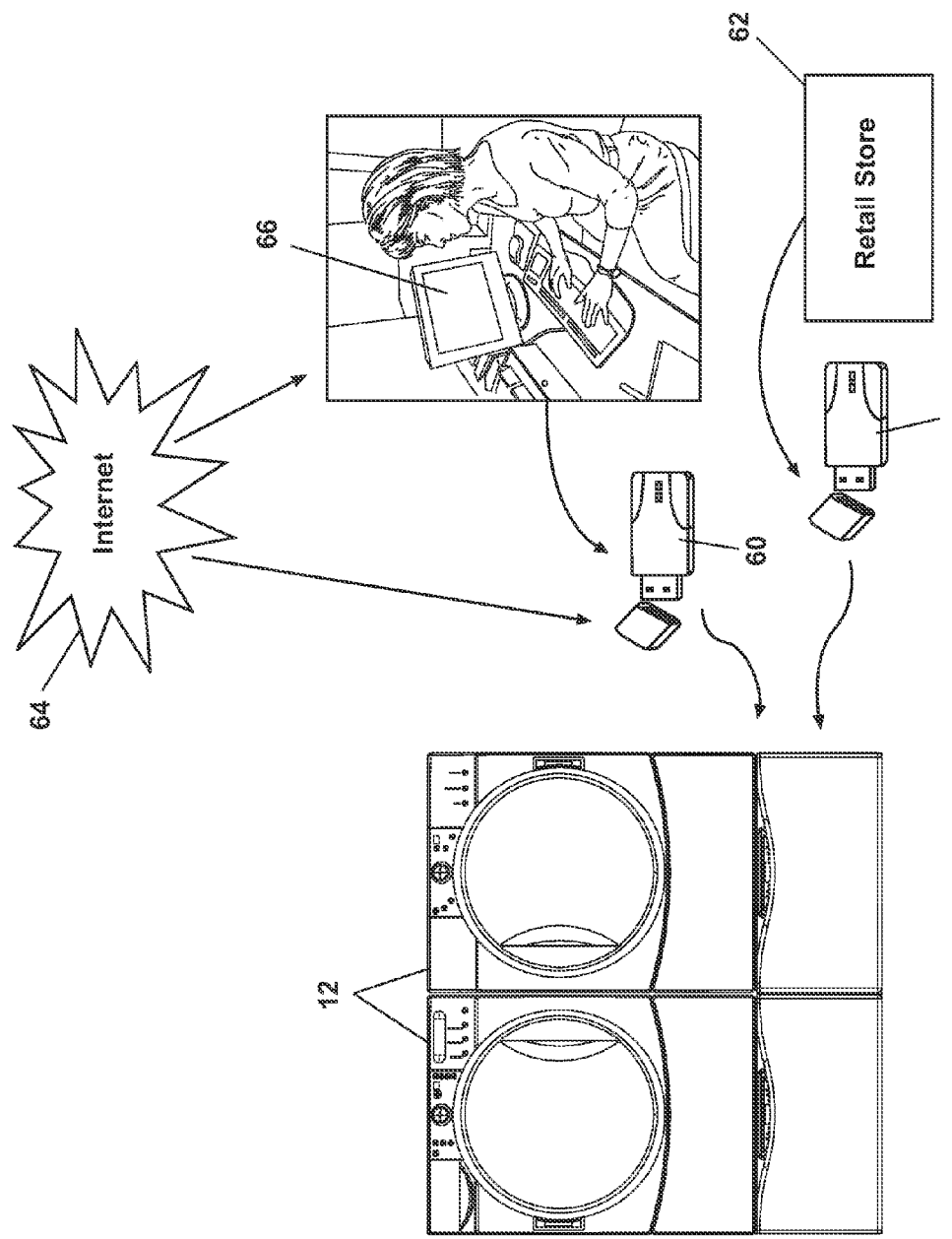
FIG. 10 is a schematic view of an operation cycle component according to one embodiment of the invention for use with a communicating appliance.

Another example of an accessory is an operation cycle component configured to store and transfer operation cycles for the appliance. An operation cycle is a set of commands that the appliance executes for operation of the appliance. For example, a washing machine can have several wash cycles that depend on the type of fabric being washed or a size of a fabric load. Similarly, an oven can have several cooking cycles that depend on the type of food being cooked and the cooking process (e.g., defrosting, baking, self-cleaning). Typically, the appliance when purchased by the user has a set of operation cycles that can permanently reside in the appliance as firmware. Referring now to FIG. 10, the operation cycle component 60 can store additional operation cycles not originally provided with the appliance 12 and communicate with the appliance 12 such that the appliance can implement the additional operational cycles. The operation cycle stored by the operation cycle component 60 can also or alternatively include an updated operation cycle. The operation cycle component 60 can be any type of component, such as a hardware device that can plug into the appliance 12. In FIG. 10, the operation cycle component 60 is shown as a USB dongle that can couple with both a personal computer and the appliance 12. The USB connection and communication is just for illustration and is not limiting on the invention. Any other suitable connector and/or communication method can be used.

With continued reference to FIG. 10, the additional operation cycles can be uploaded to the operation cycle component 60 in any suitable manner. For example, the operation cycle component 60 having the additional operation cycles can be purchased at a retail store 62, or the additional operation cycles can be uploaded to the operation cycle component 60 at the retail store. Alternatively, the user can download the additional operation cycles via the Internet 64. For example, the user can download the additional operation cycles through a personal computer 66 and then upload the additional operation cycles to the operation cycle component 60, or the user can wirelessly directly download the operation cycles to the operation cycle component 60. In another embodiment, the user can develop custom additional operation cycles on the personal computer 66 and upload the custom additional operation cycles to the operation cycle component 60. In an alternative embodiment, the additional operational cycles can be transmitted wirelessly from the personal computer 66 to the appliance 12 without using the operation cycle component 60. The wirelessly transmitted additional operational cycles can be transmitted to an intermediate storage in the appliance 12. The cycles can also be authenticated by the software architecture or other methods to ensure that they are compatible with and appropriate for the appliance.

Figure 11:
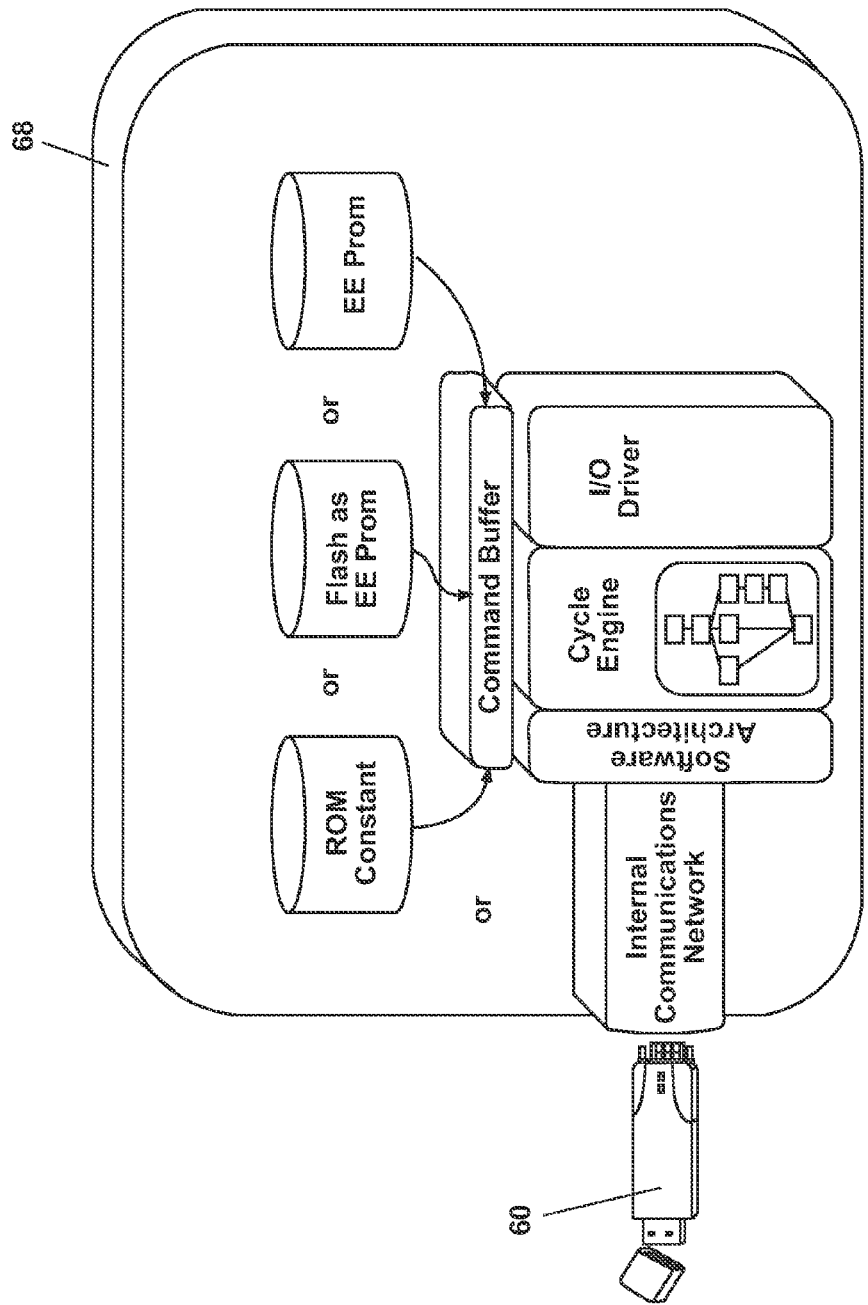
FIG. 11 is a schematic view of the operation cycle component of FIG. 10 coupled with a main controller of a communicating appliance.

The operation cycle component 60 can couple with the appliance 12 in any suitable manner, such as through a direct hardwire connection or a wireless connection. Furthermore, the appliance 12 can implement the additional operation cycles directly from the operation cycle component 60, or the additional operation cycles can be transferred from the operation cycle component 60 to the appliance 12. Referring now to FIG. 11, which illustrates a main controller 68 of the appliance 12, the additional operation cycles can be considered software that can be provided to the cycle engine. The cycle engine can operate on operation cycle data provided from multiple sources of persistence.

Other examples of an accessory include a consumable and a consumable reader. A consumable is an object external to the appliance that can be consumed or otherwise used during operation of the appliance or following operation of the appliance. The consumable can be consumed by the appliance or by the user. Examples of consumables include, but are not limited to, detergents and other wash aids for a laundry appliance and/or dishwasher, fabric items (e.g., clothing), heat and serve meals, frozen side dishes, frozen meals, microwave popcorn, frozen pizza, and frozen breakfast sandwiches. Characteristics or information, such as an operating cycle, usage directions, cooking instructions, dosage information, and washing/drying instructions, associated with the consumable can persist, for example, within the consumable itself, in the packaging for the consumable, or in auxiliary materials, such as user manuals and tags, provided with the consumable.

The consumable reader is a component that can accept the information associated with the consumable and transmit it to the controller of the appliance. The consumable reader can be a device integrated with the appliance or a separate device that can be coupled, either by a hardwire connection or wireless connection, to the appliance for communication with the appliance. Examples of consumable readers include, but are not limited to, bar code scanners, radio frequency identification (RFID) tag readers, and magnetic strip readers.

Figure 12:
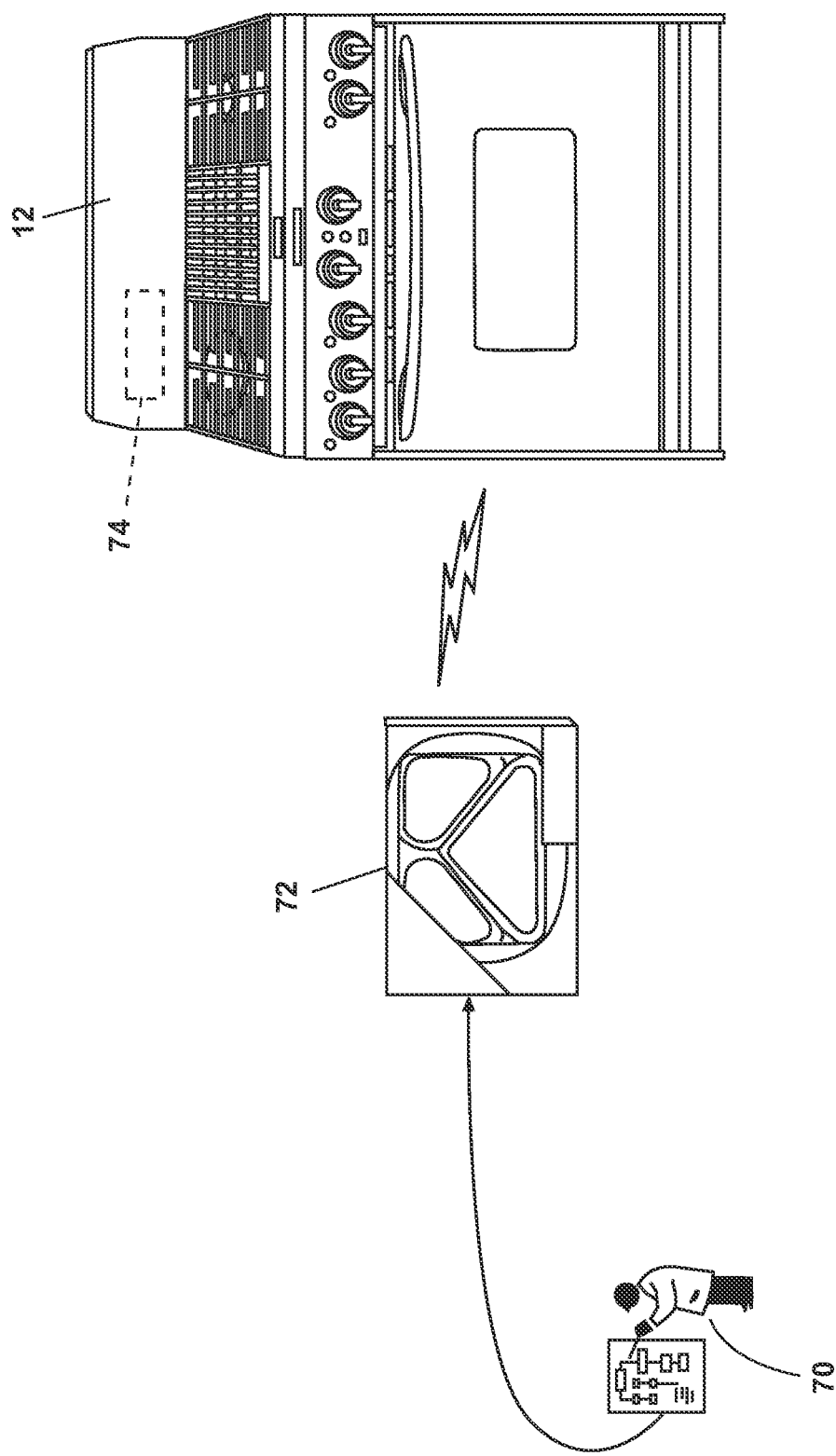
FIG. 12 is a schematic view of a consumable and a consumable reader according to one embodiment of the invention for use with a communicating appliance.

The consumable reader communicates the information associated with the consumable to the appliance so that the appliance can optimize its performance for the consumable. An example of employing the consumable and consumable reader is provided in the schematic illustration of FIG. 12. In this example, a food provider 70 determines cooking instructions for a consumable 72 in the form of a frozen meal and encodes the packaging for the consumable 72 with the cooking instructions. The user can place the consumable 72 in the vicinity of the appliance 12 in the form of an oven, and a consumable reader 74 of the appliance 12 communicates the encoded cooking instructions from the consumable 72 to the appliance 12. The appliance 12 can then execute the cooking instructions for preparing the frozen meal.

It is contemplated that the consumable will contain information corresponding to a preferred operating cycle for the consumable. In the case of a food item, the information would correspond to a cooking cycle for the consumable. The consumable can also have the ability to identify the appliance and provide an appliance-specific operating cycle. One manner of implementing this is for the consumable to have operating cycles corresponding to a particular appliance or class of appliance. The appliance in which the consumable is used identifies and implements the relevant operating cycle. Another manner of implementation is for the consumable to have an identifier and the appliance has stored or access to a database or table of operating cycles for different consumables. The appliance takes the consumable identifier and looks up the corresponding operating cycle for the consumable.

The information associated with the consumable can be in any suitable form. In one embodiment, the information can be a communication packet that can be directly transmitted to the software architecture, thereby eliminating a need for a central storage of consumables data. In another embodiment, the information can be a key that can be used to direct the appliance to stored consumables data.

It is within the scope of the invention to utilize the consumables without the consumable reader. For example, the consumable can be configured to directly communicate with the appliance or other component on the network without employing an intermediate consumable reader.

The consumables can be supplied by a third-party provider, as in the case of store-bought frozen meals and wash aids for laundry appliances and/or dishwashers, or provided by the user. Leftovers and cooked and uncooked prepared foods are examples of consumables that can be provided by the user. The leftovers and the prepared foods can be placed in a storage container encoded with information related to the leftovers and prepared foods. For example, the information can include re-heat or cooking instructions and an expiration date (i.e., throw away date). When the information includes the expiration date, the appliance, such as the oven or microwave oven, can refuse to re-heat or cook the food if the current date is past the expiration date. Optionally, the appliance can be configured to receive an override command from the user when the user desires to re-heat or cook the food despite the expiration date.

Any suitable material can be used to encode the information, and examples include, but are not limited to, plastic wrap, aluminum foil, pots, pans, microwave-safe containers, container lids, and an adhesive or magnetic strip that can be placed on the storage container. The information can be configured by the person who originally prepared the leftovers and the prepared foods and encoded using any suitable means, such as a personal computer, a magnetic strip writer, and a handheld encoding device. With this configuration, the user can configure the information on the consumable as desired.

Along the lines of the consumables and the consumable readers, another example of an accessory is a recipe book and a recipe book scanning wand. The recipe book can contain various recipes having associated cooking instructions, and the cooking instructions can be extracted by the recipe book scanning wand. For example, the cooking instructions can be extracted from text of the recipe book or hidden or visible encoding. The recipe book scanning wand can then communicate, via hardwire or wireless connection, the cooking instructions to the appliance for execution. In an alternative embodiment, the recipe book can directly communicate with the appliance without employing the recipe book scanning wand.

Another example of an accessory is a commercial laundry credit accessory. The commercial laundry credit accessory can be any suitable device, such as a card with memory and/or a microprocessor (commonly known as a "smart card") and a dongle. The commercial laundry credit accessory can store laundry operation cycle credits and communicate with the appliance in the form of a commercial laundry appliance, such as at a public laundry facility, via a direct or wireless connection. When the commercial laundry credit accessory has sufficient credits, the appliance will operate and deduct credits from the commercial laundry credit accessory based on the operation of the appliance. Optionally, individual users can purchase the laundry operation cycle credits, or others can purchase the laundry operation cycle credits for gifting purposes. In one embodiment, the laundry operation cycle credits can be purchased at the public laundry facility or remotely, such as via the Internet.

The credit accessory can also be used in combination with the software architecture to track usage and transferring the usage information to a local or remote central system. Price changes and other operating parameters for the laundry can be changed by the credit accessory. The price change can be linked to other information accessible through the software architecture, such as energy costs, for example. The credit accessory can also collect diagnostic information and call for service or alert the owner if there are any pending issues via wired or wireless. The smart card can also be used to supply alternate content to the user interface of the appliance, such as advertisement, for example.

Another example of an accessory is a customized connector that can be used to couple the appliance with another accessory or with another component on the network. The customized connector can be associated with any item, such as a cable or a dongle, that can couple with the appliance, and can be configured to prevent unauthorized, third-party devices, including generic brand replacement parts, from undesirably coupling with the appliance and other components on the network. Thus, the connecting item must have the customized connector to couple with the appliance or other component on the network.

Another group of exemplary accessories relate to energy usage. For example, the accessory can be an energy controller and/or energy monitor, hereinafter referred to collectively as the energy controller. The energy controller can be a separate component on the network that communicates with several appliances and other networked components in the home and also with an energy source, such as an electricity source. The energy controller can monitor the amount of energy used by each of the appliances and can distribute energy among the appliances. The distribution of energy can result in an efficient usage of energy and can also manage energy usage, for example, when the energy source curtails the amount of supplied energy. The energy controller can also control the operation of the appliances so that the operation occurs during non-peak energy usage times, which typically correspond to lower energy costs.

Figure 13:
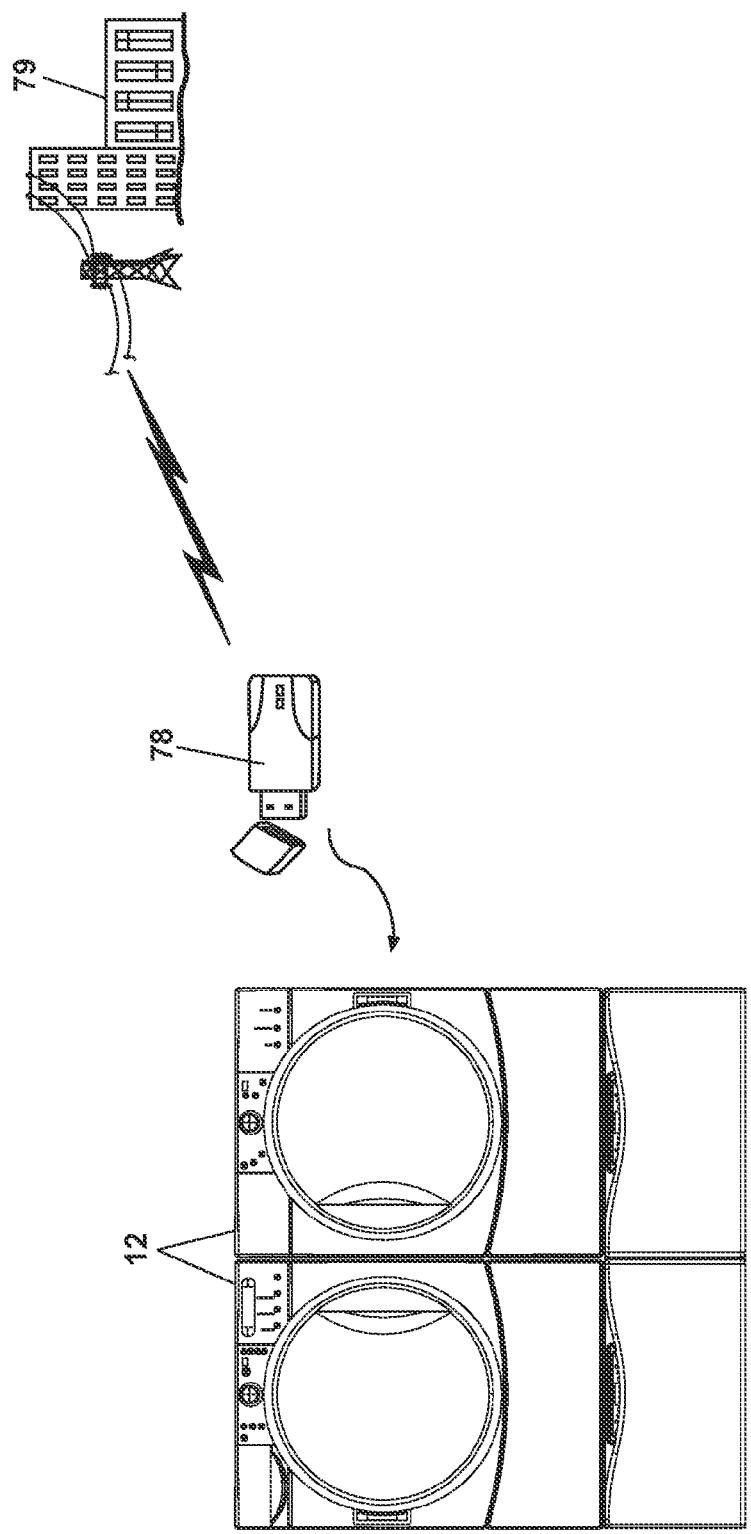
FIG. 13 is a schematic view of a connection assembly according to one embodiment of the invention for use with a communicating appliance and an energy controller.

The energy controller can be internally configured for communication with the appliances, or a separate connection accessory, such as a dongle, can be coupled to the energy controller to provide connectivity to the appliances. Similarly, the appliance can be internally configured for communication with the energy controller, or a separate connection accessory 78, such as a dongle, as illustrated in FIG. 13, can be coupled to the appliance 12 to provide connectivity to the energy controller. The connection accessory can have the ability to discover the type of appliance and provide appropriate modules of the software architecture for the appliance. In addition, the connection accessory can have the ability to respond to messages and commands from the energy controller. The connection accessories can be configured to provide wireless communication between the energy controller and the appliances.

The energy controller 78 can be connected to an energy supplier by any suitable means, such as, wireless, Internet, power lines, etc. With such a connection, the energy supplier can provide information relevant to the control of the appliance. The energy supplier can also remotely control the appliance in addition to or in lieu of providing information.

Other energy related accessories include a smart breaker, a smart dimmer, and a smart adapter. The smart breaker is described in detail in U.S. Pat. No. 6,988,375, issued Jun. 24, 2006 which is incorporated herein by reference in its entirety.

The smart dimmer is effectively a replacement for a load switch, such as a light switch, having discrete on/off control and can be used in any component on the network, including lights and ceiling fans. The smart dimmer provides the ability to not only switch power on and off but also to vary voltage, such as via triac control or converter/inverter control. The smart dimmer communicates with the energy controller, such as to respond to requests from the energy controller and to notify the energy controller of energy consumption status. By giving the energy controller additional control over the component associated with the smart dimmer, the energy controller has more capability to achieve target energy consumption without disruption to the user. Furthermore, in the event of an emergency energy curtailment, the energy controller can communicate with the smart dimmer to dim or shut off the lights or other component associated with the smart dimmer. The smart dimmer can also have associated sensing capabilities to feedback to the energy controller measurements of watts and power-factor.

The smart adapter is functionally similar to the smart dimmer but serves as a replacement for a common wall outlet. By replacing the common wall outlet with the smart adapter, which can communicate with the energy controller in a manner similar to the communication between the smart dimmer and the energy controller, "dumb" components, such as water heaters, that typically function in off/on modes can be plugged into the smart adapter and converted for use on the network and for operation at varying voltages. As a result, the components with the smart adapters can participate in energy curtailment programs and can communicate energy usage information to the energy controller.

Figure 14:
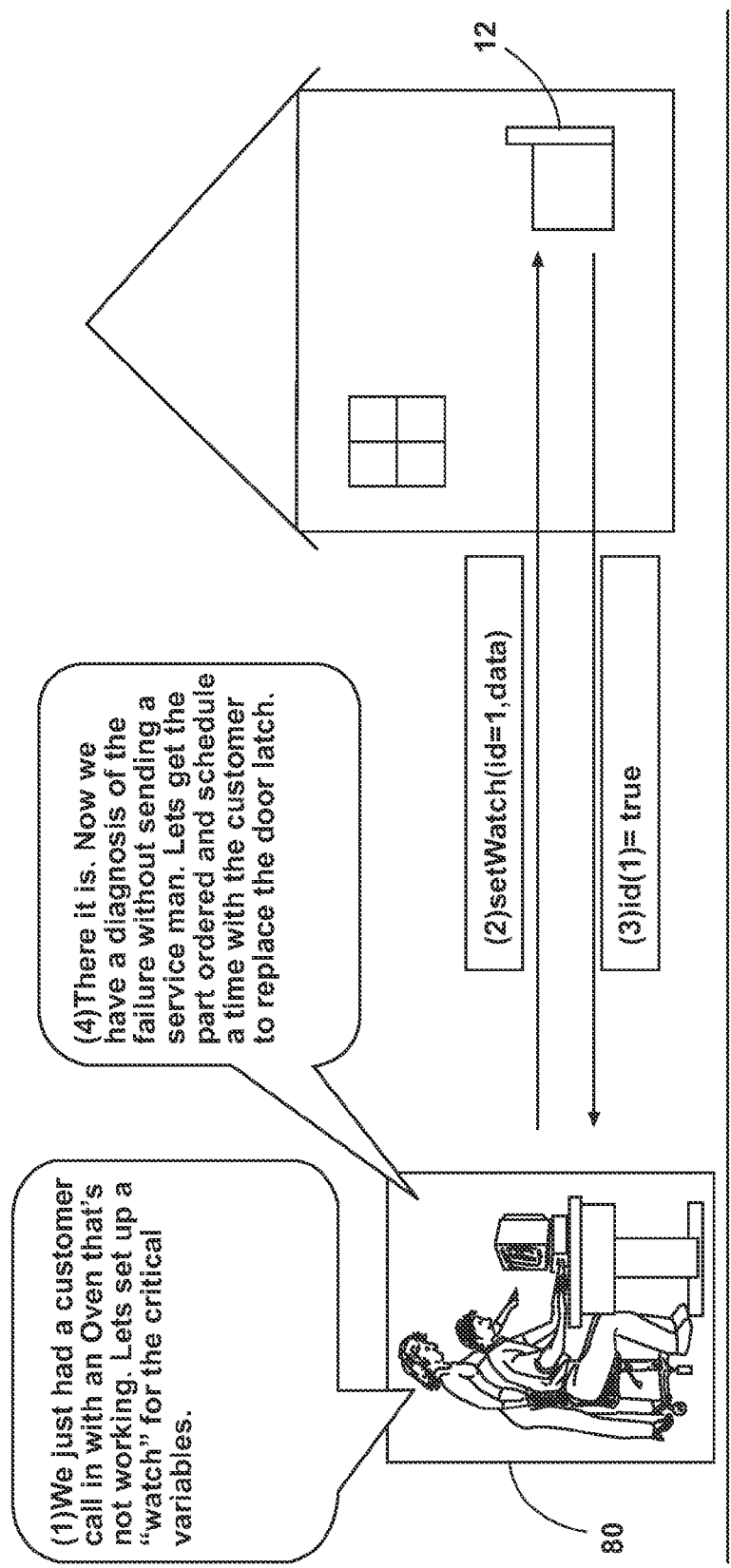
FIG. 14 is a schematic view illustrating remotely servicing a communicating appliance according to one embodiment of the invention.

Other examples of accessories relate to servicing the appliance. In one embodiment, a remote service center can communicate wirelessly with the appliance in the home. As a result, the remote service center can monitor the appliance, including low level components of the appliance, either passively or actively, and diagnose failures of the appliance. An example of passive monitoring of the appliance is illustrated in FIG. 14. In this scenario, the user communicates with the customer service center 80, such as via a telephone call or through the Internet, to inform the customer service center 80 that the appliance 12 in the form of an oven is not functioning properly. In response, the customer service center 80 communicates with the appliance 12 wirelessly to monitor the appliance 12 and diagnoses a failure associated with a component of the appliance 12, particularly the door latch. Thus, observation over the network enables the remote service center 80 to diagnose the failed component without a service visit to the home.

If information not available on the internal network of the appliance is needed for diagnosis, the remote service center 80 can use the DAQ, which is described in more detail in the aforementioned and incorporated PCT patent application to retrieve information available in memory of the associated appliance componentry for analysis of a problem or for searching for a problem.

If in addition to passive monitoring, the remote service center 80 determines the need to control and test the low level components of the appliance 12, the remote service center 80 can actively monitor the appliance 12. To actively monitor the appliance 12, the remote service center 80 can put the appliance 12 in a development state, which is described in more detail in the aforementioned and incorporated PCT patent application and priority application. In the development state, the remote service center 80 can communicate with the appliance 12 and actuate the individual components of the appliance, such as heaters, valves, and motors, to facilitate making a diagnosis. According to one embodiment, for the appliance 12 to enter the development state, the appliance 12 must be in an attended mode. In the attended mode, a responsible person must be present at the appliance to ensure that the actuation of the individual components of the appliance 12 does not harm anyone in the vicinity of the appliance 12. The responsible person can be the user of the appliance 12 or any other person deemed responsible. The presence of the responsible person can be confirmed in any suitable manner, such as by communication between an identification card of the responsible person and the appliance 12 or by the responsible person actuating a key press on the appliance 12.

As an alternative, the appliance can be monitored and diagnosed by an individual, such as the user, in the home with the aid of a service accessory rather than employing the remote service center. In this scenario, an automated service system replaces the remote service center. The service accessory can be any suitable device, such as a dongle, configured to communicate, either via a wired connection or wirelessly, with the appliance and with the automated service system.

Figure 15:
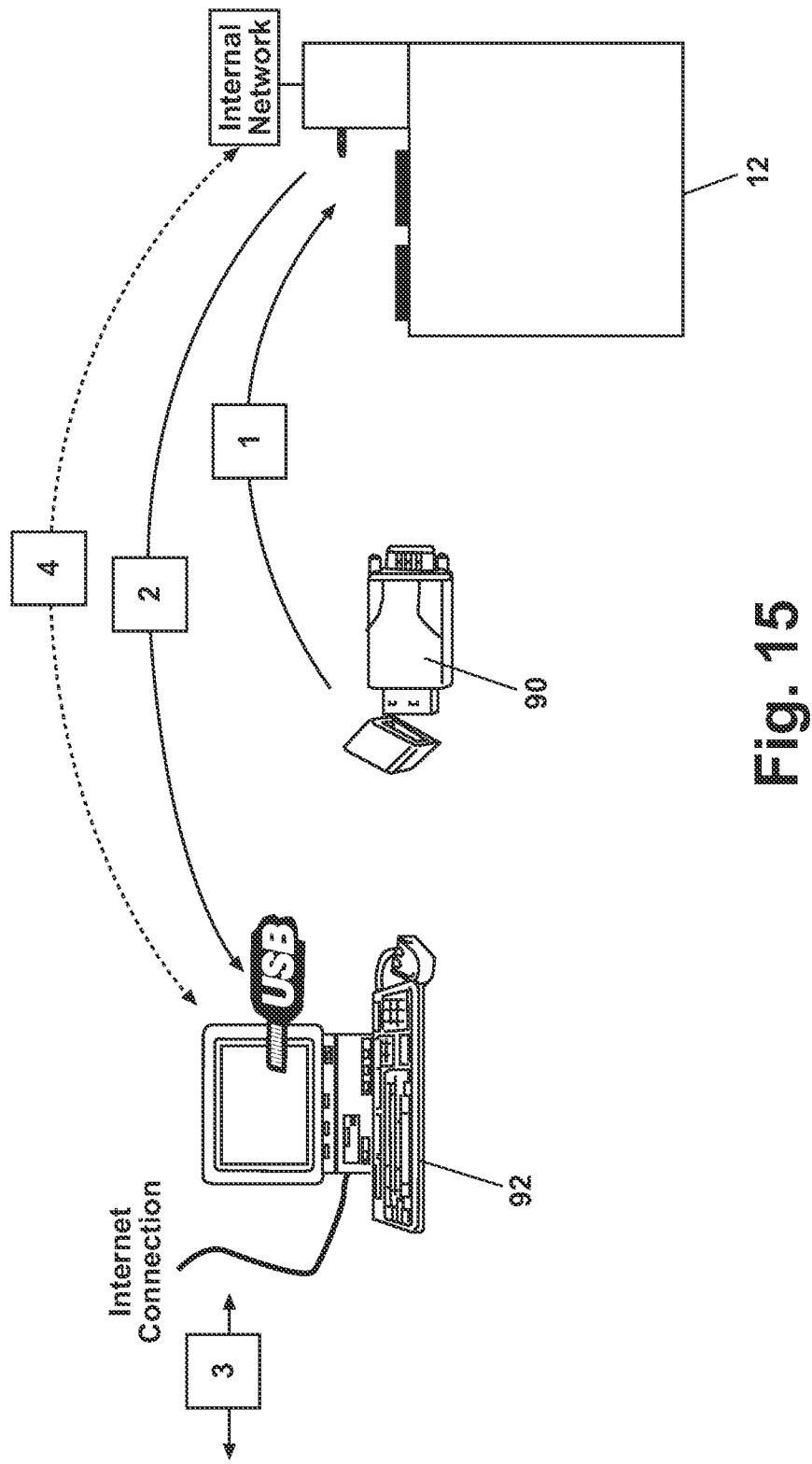
FIG. 15 is a schematic view illustrating self-servicing a communicating appliance according to one embodiment of the invention.

An example of self-servicing the application using the automated service system and the service accessory is illustrated in FIG. 15. Shown as step 1, the user couples the service accessory 90 to the appliance 12 in the form of an oven, and the service accessory 90 automatically configures to record diagnostic data from the appliance 12. If an appliance failure occurs, the user removes the service accessory 90 from the appliance 12 and couples the service accessory 90 to a personal computer 92, shown as step 2. Next, the service accessory 90 connects to the Internet via the personal computer 92, shown as step 3, and uploads the diagnostic data associated with the appliance failure to the automated service system. The automated service system analyzes the diagnostic data and determines an appropriate response. The response can include, for example, downloading customized testing scripts based on the diagnostic data, and the testing scripts can be used to further diagnose the appliance failure or eliminate the problem. The testing scripts can be downloaded via the Internet and the personal computer 92 to the service accessory 90, which can be re-coupled to the appliance 12, shown as step 4, for transferring the testing scripts to the appliance 12. Alternatively, the service accessory can be a coupling mechanism allowing a computing device, such as a cellular phone, a personal computer, and a personal digital assistant, to execute logic associated with data collection, analysis, and test scripts.

Other examples of accessories relate to home automation. Home automation systems are systems with a control center configured to control multiple objects, such as lights, drapes, blinds, thermostats, audio/video components, and security systems, within a home. Typical control centers are in the form of a monitor, such as a touchpanel monitor, or a remote control with a customized keypad. With the software architecture, the appliance can be integrated with the home automation system. In one embodiment, the appliance can be added to an existing home automation system whereby the appliance can be controlled, monitored, etc. from the control center. The appliance can optionally communicate with the control center via a wireless device coupled to the appliance. Alternatively, the appliance can be used as the control center.

For example, a kitchen is generally a centralized location in the home, and one of the appliances, such as a refrigerator, in the kitchen can include the control center. In this example, the control center can be a monitor integrated into a door of the refrigerator.

By combining the appliance and the home automation system, several synergistic features become feasible. For example, when a fire alarm or smoke detector of the home automation system detects a fire or smoke, the combined appliance/home automation system can take appropriate actions, such as turning off an oven and cooktop, turning off HVAC systems, turning on lights, and shutting off gas supply. In another example, the user can set the combined appliance/home automation system in a vacation mode. Upon departure and during the vacation, the combined appliance/home automation system can take appropriate actions, such as shutting off water supply, turning off water heaters, increase refrigerator temperature, enable alarms, and setup an automatic telephone call to police if the refrigerator door opens. On return, the combined appliance/home automation system can take appropriate actions, such as turning on water supply, turning on water heaters, decrease refrigerator temperature, and disable alarms.

As another example, the combined appliance/home automation system can provide notifications to the user for time management benefits and peace of mind. Notifications for time management benefits can include, but are not limited to, fabric/dish washing complete, fabric/dish drying complete, microwave defrost complete, turn food for microwave defrost, oven pre-heat complete, and food cooking complete. Upon receiving the notification, the user can immediately attend to the corresponding appliance to remove the fabric load, dish load, food, etc. rather than spending the time to periodically having to check whether the operation cycle is complete and possibly delaying initiation of another operation cycle. Notifications for peace of mind can include, but are not limited to, refrigerator door ajar, freezer door ajar, water filter operational, oven left on, cooktop left on, basement humidity level satisfactory, air filtration system functioning, air quality index, boil over on cooktop, and grill flame exceeding limit.

The notifications can be provided to the user on the control system or a remote device that can be used outside the home. Examples of remote devices include, but are not limited to, a cellular phone, a key fob, and a pager/buzzer. The remote device can be configured with the software architecture for communication with the appliance or other component on the network.

Another example of an accessory is a network binder. The network binder is a device that binds nodes on a wireless network to the network by assigning an identical unique network ID to each node. Binding allows nodes that are within communication range of each other to be bound together to create private networks and separate the nodes from other nodes that are also within communication range but not part of the network. The network binder can be useful when there are multiple networks within range of one another, as in a neighborhood or an apartment building. The private network prevents communications from being inadvertently transmitted between networks, which would prevent unexpected interactions. The network binder of the present application can be a wireless device that is solely used for binding appliances or other components in a relatively short range of the network binder using one-click. For example, the network binder can have a limited transmission range of about three to four feet to ensure that the target appliance or other component becomes bound to the network when the network binder is operated. An exemplary network binder 100 is illustrated in FIG. 16 and comprises at least one button 102 that can be depressed when in the vicinity of the appliance 12 or other component to bind the appliance 12 or other component to the network. The network binder can optionally have the ability to communicate with a personal computer or other computing device so that the computing device can also be configured.

Figure 29:
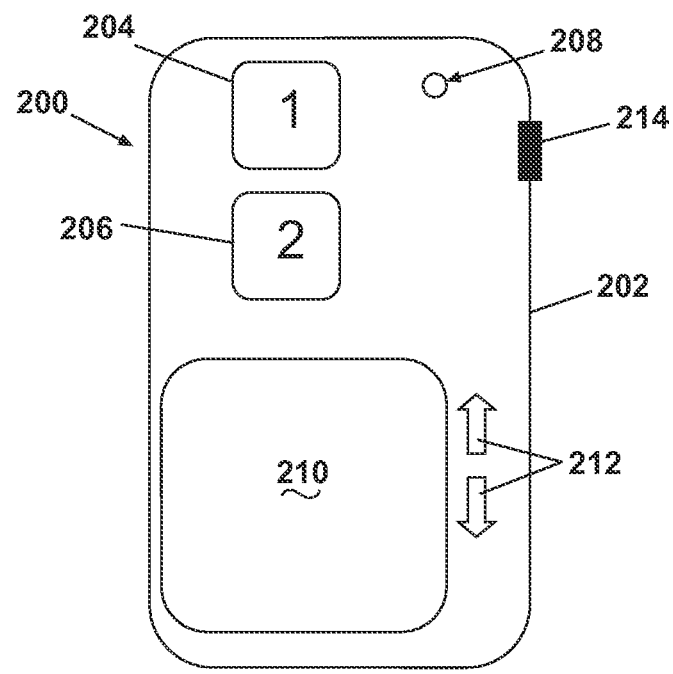
FIG. 29 is plan view of a alternate embodiment of a network binder accessory according to the invention.
Figure 30:
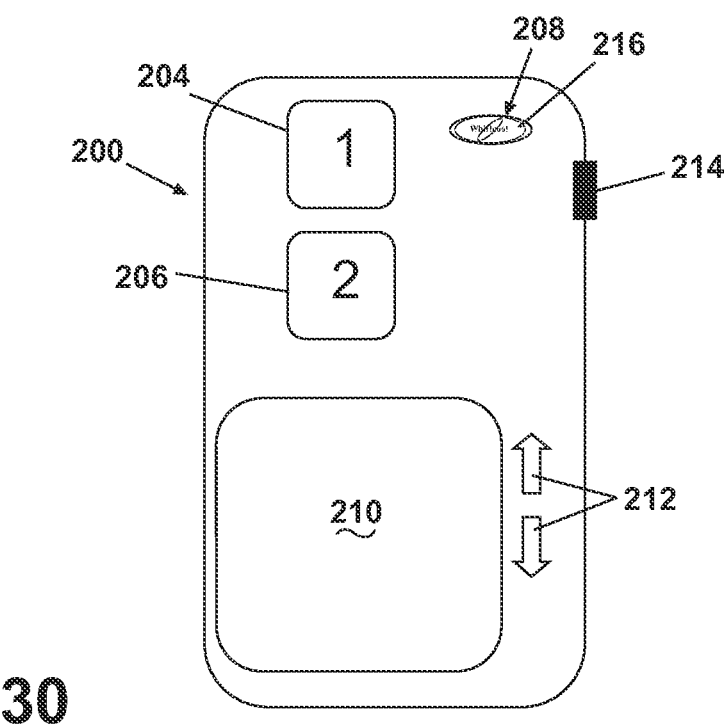
FIG. 30 as another embodiment of the network binder accessory of FIG. 29.

Other embodiments of a network binder are shown in FIGS. 29 and 30. In FIG. 29, the network binder 200 comprises a powered fob 202 having first and second buttons 204, 206, a visual indicator 208 such as an LED, and a graphical interface 210, such as a small LCD screen, with navigation buttons 212. The fob 202 is configured to communicate wirelessly, and to recognize the identifiers of any network within which the fob is in proximity. When a user moves the fob 202 within the proximity of a network node to which it can establish communication, the LED will illuminate to indicate the existence of a communicable node. The network binder will automatically retrieve information about the node and the network.

The user can press the first button 204 to cause the graphical interface 210 to display basic information from the node. Relevant basic information can comprise a plurality of network ID's on which the node is currently connected, the addresses of the node on a plurality of networks, where each network is identified by its own network ID, and/or a plurality of user-friendly names of the node on the plurality of networks. The navigation buttons 212 enable scrolling if the information is too much to display on a single screen.

The user interface 210 can also be configured to display identification and information about networks that the network binder has thus far configured, including the nodes for each network and relevant information about each.

The network binder 200 functions to set a new additional network ID into a node on an existing network and thus establish a new, private network apart from any existing network. This is completely different from the apparatus used for binding networks in such technologies as wi-fi or Zigbee®. Here, the inventive technique is at a minimum, "one-click" binding while in proximity with a node. Once the user identifies a node for placing into the private network, the user can select from a plurality of network IDs and press the second button 206. Pressing button 206 causes the network binder 200 to send a special network message to the selected node within proximity to receive a private network ID. When the identified node receives the network ID, it can send a message to the private network corresponding to the private network ID to establish useful communications with other nodes having the same private network ID.

The network binder 200 also has a connector port 214 that would enable connection to a personal computer configuration utility. One benefit of the connection port 212 is to enable firmware updates to the network binder 200. It is to be understood that any or even most of the functionality of the network is optional. For example one may not want or need the graphical user interface 210, the navigation buttons 212, or two buttons. At a minimum, one would normally want an indicator to indicate when one is within proximity of a network node and a button to send signal indicative of the private network ID. The entire network binder 200 could be made with minimal functionally, or if provided the aforementioned features, some or all of the features could be disabled, to be later re-enabled by possessing a key or a firmware upgrade. Additionally, optional functionalities could reside in a connected pc utility.

FIG. 30 shows a modification of the network binder of FIG. 29, where identical components bear the same references. Here, the only difference is in the visual indicator 208 which comprises a display of licensed information 216 such as a trademark. Preferably the licensed information will illuminate when the network binder comes within proximity of a node on a network.

Figure 17:
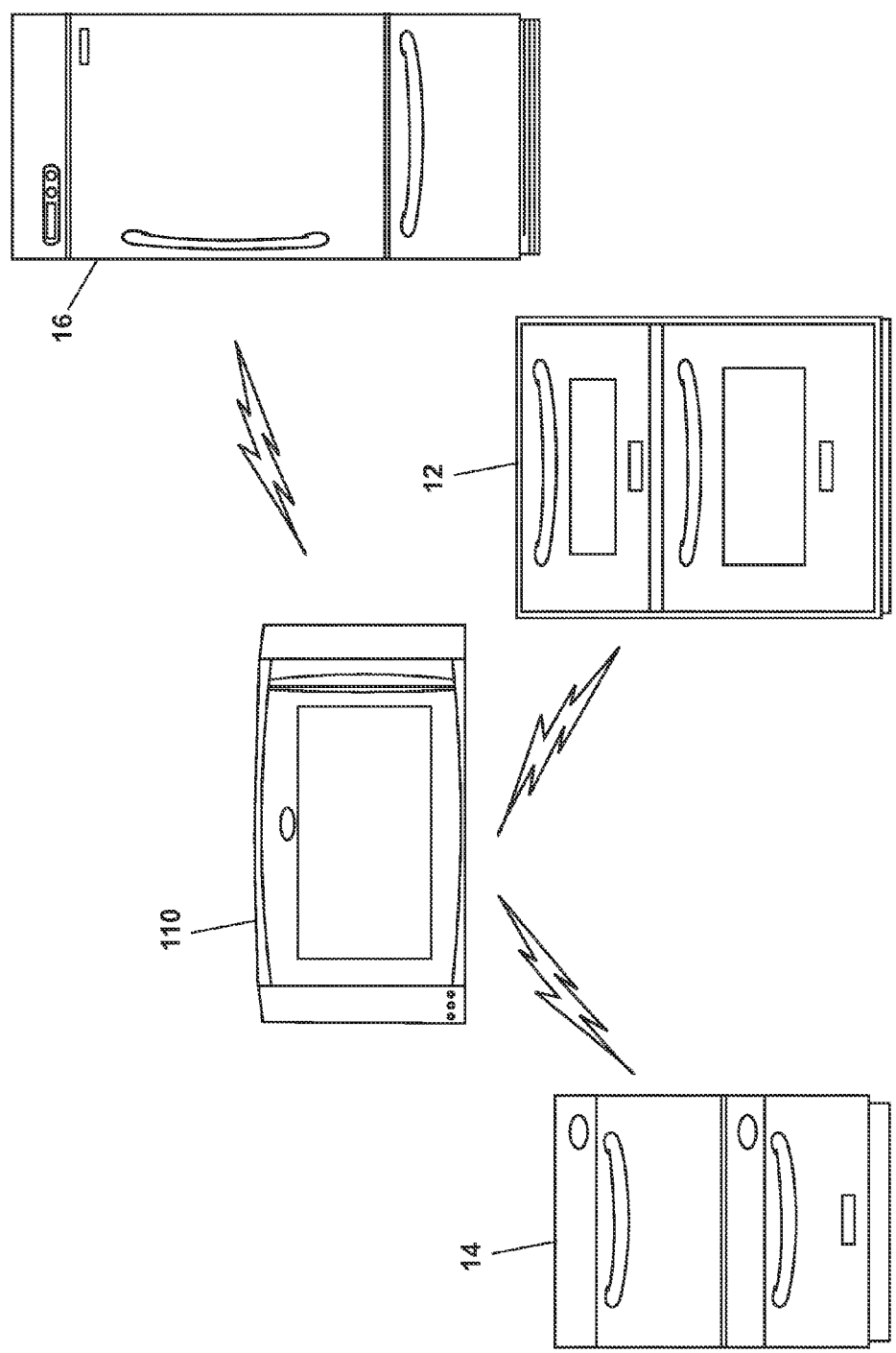
FIG. 17 is a schematic view of a remote user interface according to one embodiment of the invention for use with a communicating appliance.

Another example of an accessory is a remote user interface. The remote user interface is a user interface that can communicate with one or more appliances and can be positioned remotely from the appliances with which the remote user interface communicates. For example, the remote user interface can be positioned in a central location in the home or can be portable within the home. The remote user interface can provide many, if not all, of the functions associated with a traditional user interface of the appliance and can include additional functionalities. The remote user interface can have any suitable form, such as a monitor, including a touchpanel monitor 110, as illustrated in FIG. 17. Other examples of the remote user interface can include, but are not limited to, a remote keypad, a phone, a personal computer, a voice recognition device, a voice generation device, a sound generation and recognition device, a remote control, a user interface of a home automation system, a user interface of a component different from the components of the appliance, a television, a device that plays recorded music, a device that plays recorded video, and a personal digital assistant. According to one embodiment, the remote user interface can be employed in addition to the traditional user interfaces on the appliances associated with the remote user interface. Alternatively, the appliances associated with the remote user interface do not include a separate user interface that physically resides on the appliances. Furthermore, the remote user interface can be used in conjunction with the above-described combination appliance/home automation system.

Another example of an accessory is an appliance monitor. The appliance monitor, which can be a device integrated with or separate from the appliance, monitors and records operational data associated with the appliance. The appliance monitor can monitor one appliance or a plurality of appliances. Optionally, the appliance monitor can include a display for displaying an operational status of the appliance and can be integrated with the remote user interface described above to also provide the ability to issue commands to the appliance. Furthermore, the appliance monitor can optionally be configured to transmit the operational data associated with the appliance to another device, such as a personal computing device or an intermediate storage device, such as a dongle.

Figure 18:
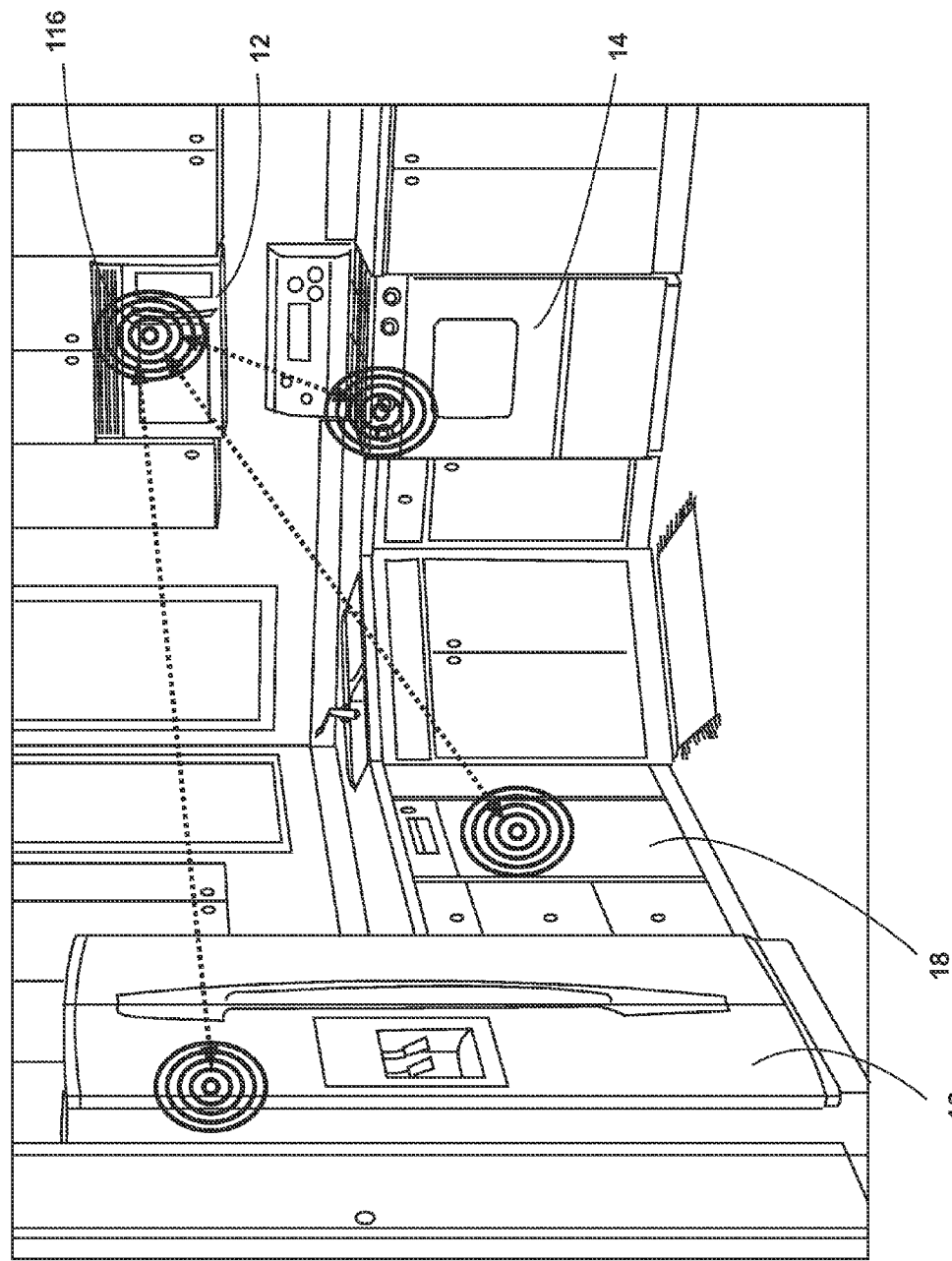
FIG. 18 is a schematic view of an appliance monitor integrated into a communicating appliance according to one embodiment of the invention.
Figure 19:
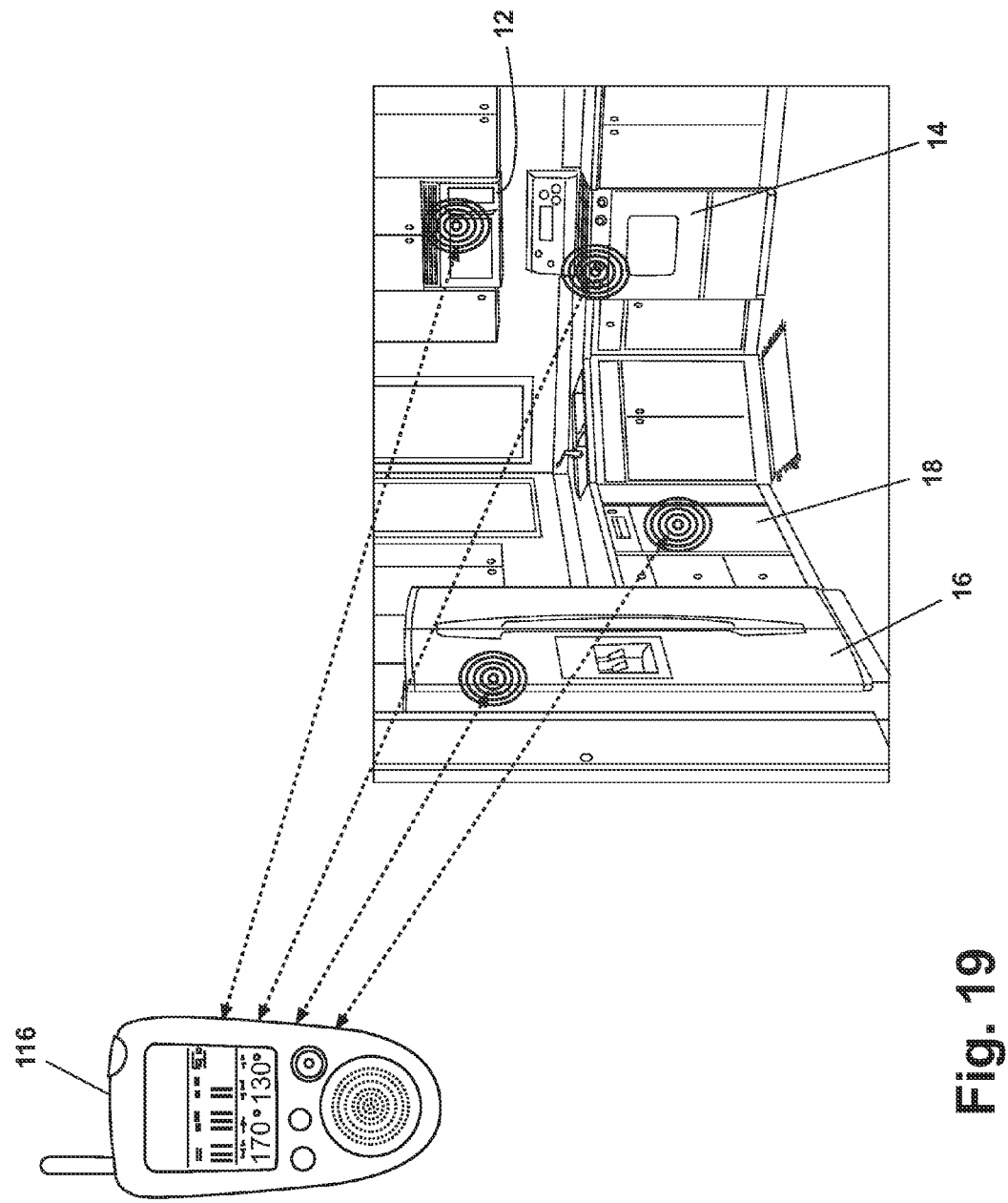
FIG. 19 is a schematic view of a remote appliance monitor according to one embodiment of the invention for use with a communicating appliance.

In an example illustrated in FIG. 18, the appliance monitor 116 is integrated into the first appliance 12 in the form of a microwave oven, and the second, third, and fourth appliances 14, 16, 18, along with the first appliance 12, communicate with the appliance monitor 116. In another example illustrated in FIG. 19, the appliance monitor 116 is a separate, portable device that communicates with the first, second, third, and fourth appliances 12, 14, 16, 18. The portable appliance monitor 116 can be carried by the user so that the user is able to observe the operational status of the appliance at any desired time.

Figure 20:
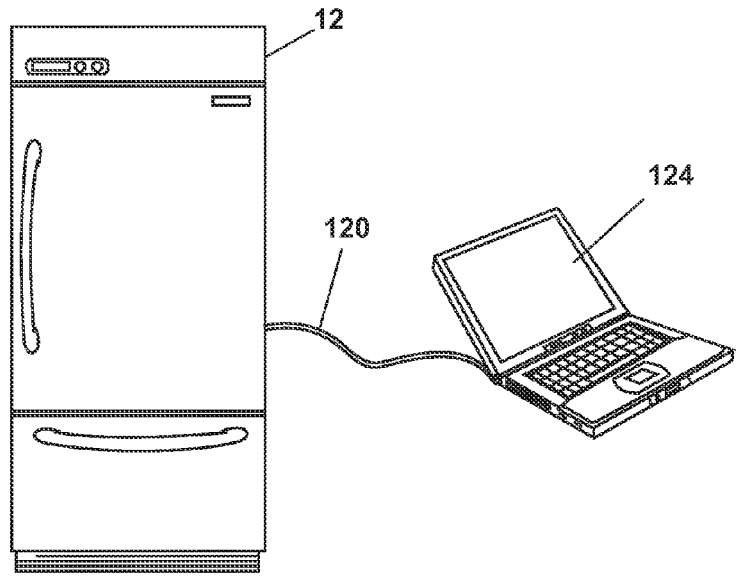
FIG. 20 is a schematic view of a smart cable according to one embodiment of the invention for use with a communicating appliance.
Figure 21:
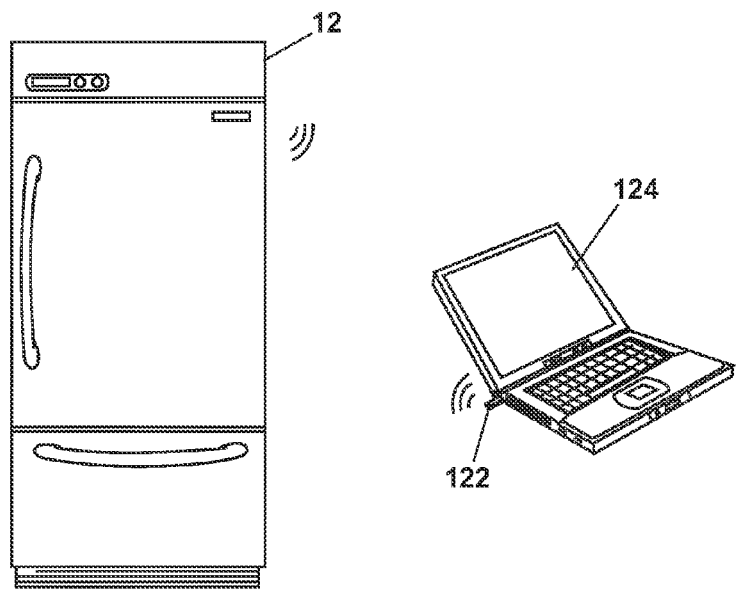
FIG. 21 is a schematic view of a smart wireless connector according to one embodiment of the invention for use with a communicating appliance.

Other examples of accessories relate to servicing the appliances. If the appliance experiences a failure that requires a service person to visit the appliance in the home, the service person can couple a personal computer or other portable computing device to the appliance using a smart cable 120 or a smart wireless connector 122. As shown schematically in FIG. 20, the smart cable 120 hardwires the appliance 12 with the portable computing device 124. The smart cable 120 can include special, proprietary electronics that enable communication between the appliance 12 and the personal computing device 124. As a result, unauthorized persons who do not have the smart cable 120 cannot couple an unauthorized computing device with the appliance. Referring now to FIG. 21, the smart wireless connector 122 accomplishes the same goal as the smart cable 120, except that the former provides a wireless rather than hardwired connection between the appliance 12 and the portable computing device 124. The smart wireless connector 122 can be any suitable device, such as a proprietary wireless dongle, that establishes a proprietary connection between the appliance 12 and the portable computing device 124.

Figure 22:
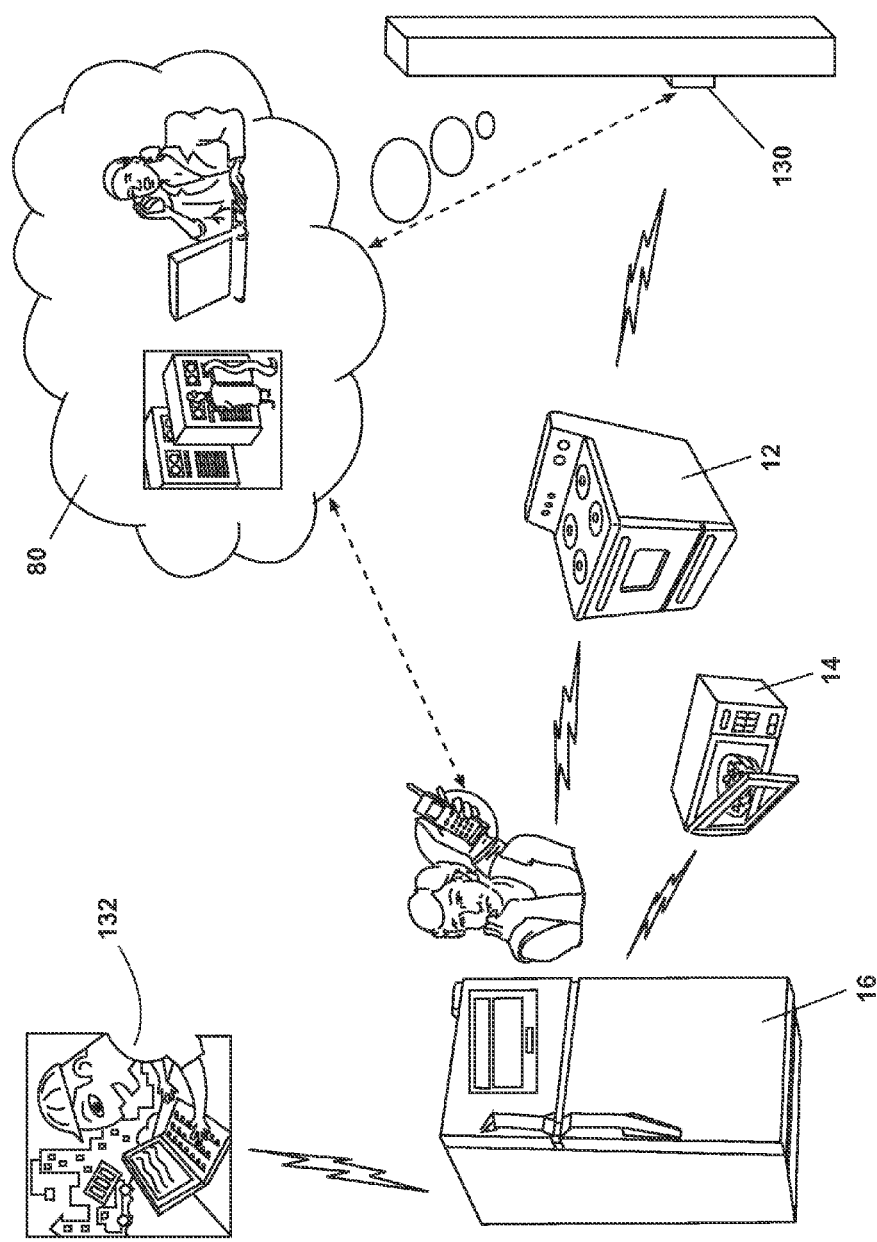
FIG. 22 is a schematic view of a central collector according to one embodiment of the invention for use with a communicating appliance.

Additional service-related accessories include a central collector 130 and a local collector 132, which can implement the same service-related functions previously described. Referring to FIG. 22, the central collector 130 functions similarly to the appliance monitor described above in that the central collector 130 communicates with the appliance(s) and monitors and records operational data associated with the appliance(s). The central collector 130 is illustrated in FIG. 22 as a box mounted to a wall in the home, but the central collector 130 can assume any suitable form and can be located in any suitable location, including on or in the appliance. The central collector 130 can communicate with the appliances 12, 14, 16, such as via a wireless connection, and the remote service center 80 can also communicate with the central collector 130. As a result, when an appliance failure occurs, the user can communicate with the remote service center 80, such as via telephone, to inform the remote service center 80 of the appliance failure, and the remote service center 80 can communicate with the central collector 130 to receive and analyze the operational data associated with the failed appliance. Furthermore, if the appliance failure requires a visit from a service person 132, the service person 132 can optionally communicate with the central collector 130, such as via a portable computing device, to receive and analyze the operational data associated with the failed appliance. The central collector 130 can also be employed by the service person 132 for field testing of the appliance. While illustrated external of the appliances, the central collector can be located within one of the appliances.

The central collector 130 can also be used for aggregation of customer usage data. The customer usage data can be sold to third parties and can be used in customer studies to gain insight to customer usage patterns and preferences. As another option, the central collector 130 can be used for benchmarking. The operational data associated with the appliance can be aggregated and compared to benchmarks or used to generate benchmarks related to appliance performance. When the operational data is compared to a benchmark, and the comparison indicates a degradation of appliance performance, the user can be alerted to the decrease in performance.

A derivative of the central collector 130 is a black box recorder. The black box recorder can function similarly to the central collector 130 but is constructed such that it cannot be destroyed or at least retains the operational data associated with the appliance in case of a fire or other event potentially destructive event to the appliance or the home. The operational data can possibly be used by insurance companies and investigators to assess the cause and effects of the destructive event.

Figure 23:
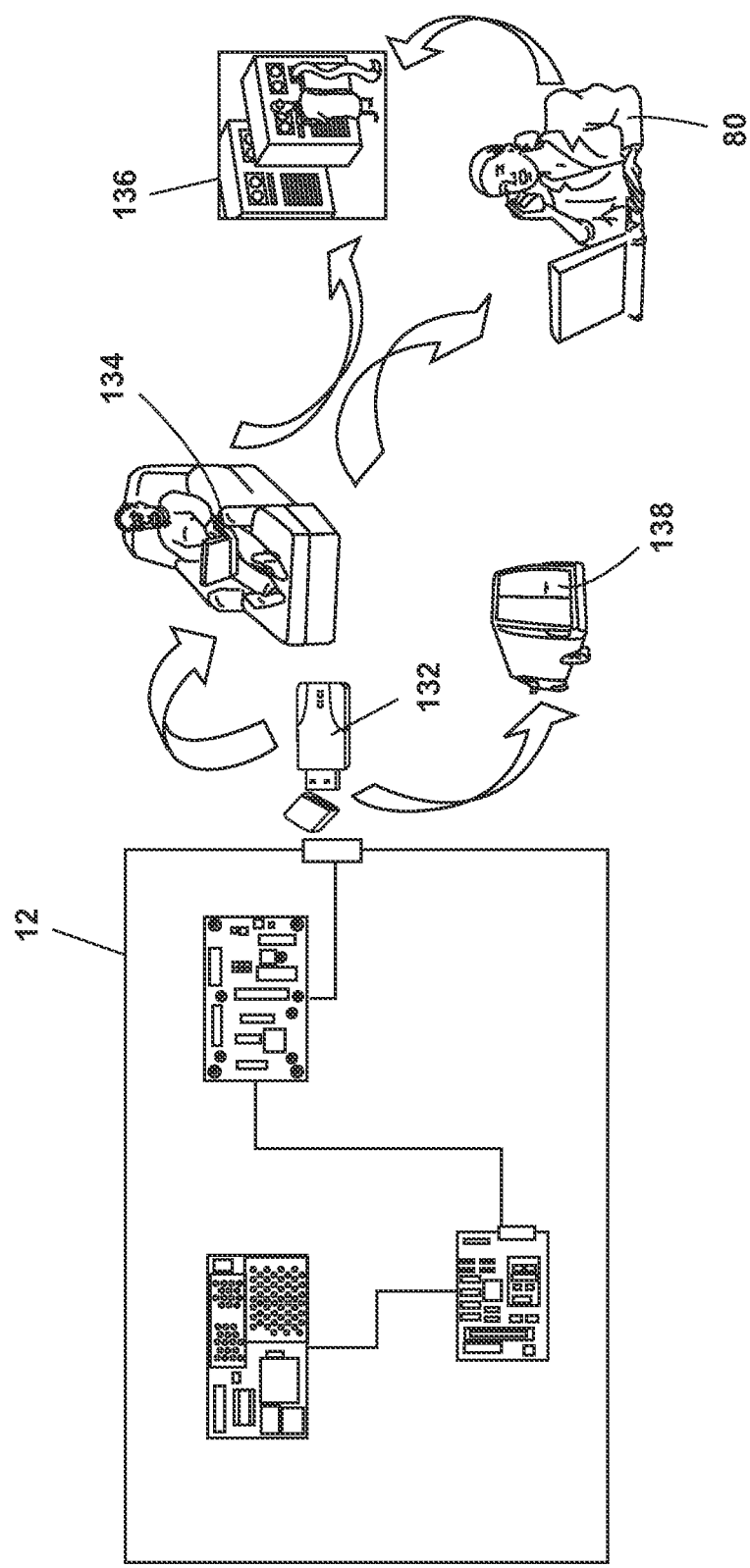
FIG. 23 is a schematic view of a local collector according to one embodiment of the invention for use with a communicating appliance.

Referring now to FIG. 23, the local collector 132 functions similarly to the central collector 130 in that the local collector 132 communicates with the appliance(s) and monitors and records operational data associated with the appliance(s); however, the local collector 132 is a portable device that can removably couple with the appliance(s). As shown in FIG. 23, where the local collector 132 is illustrated as a dongle, the local collector 132 can be coupled with the appliance 12 to receive the operational data associated with the appliance 12 and removed from the appliance 12. After removal from the appliance 12, the local collector 132 can be coupled with a computing device 134 of the user, and the operational data can be sent from the computing device 134, such as via the Internet, to a remote location, such as the remote service center 80 or a remote automation center 136. If the user does not have the computing device 134 or an Internet connection, then the local collector 132 can be provided to a shipping service 138 for delivery to the remote location.

The local collector 132 can be implemented using the service accessory 90. Either of the local collector 132 or the service accessory 90 can be interfaced with the electrical system of the appliance and with either the appliance or with a service tool (accessory) to perform enhanced diagnostics and performance analysis of the appliance. Exemplary uses would be to validate that each output device (when acutated) consumes the expected electrical consumption, and to realize certain performance or failure conditions by evaluating information contained in the electrical bus (example frequency analysis).

Another example of an accessory is an appliance coupler. The appliance coupler can be any device, such as a cable connector or a device capable of wireless communication, that enables direct communication between appliances. As a result, the coupled appliances can communicate with each other, which can be especially beneficial when the operation of one appliance affects the operation of another appliance. For example, a washing machine and a dryer can be coupled together by the appliance coupler, and the operational cycle of the dryer can be selected based on the operational cycle employed by the washer.

Figure 24:
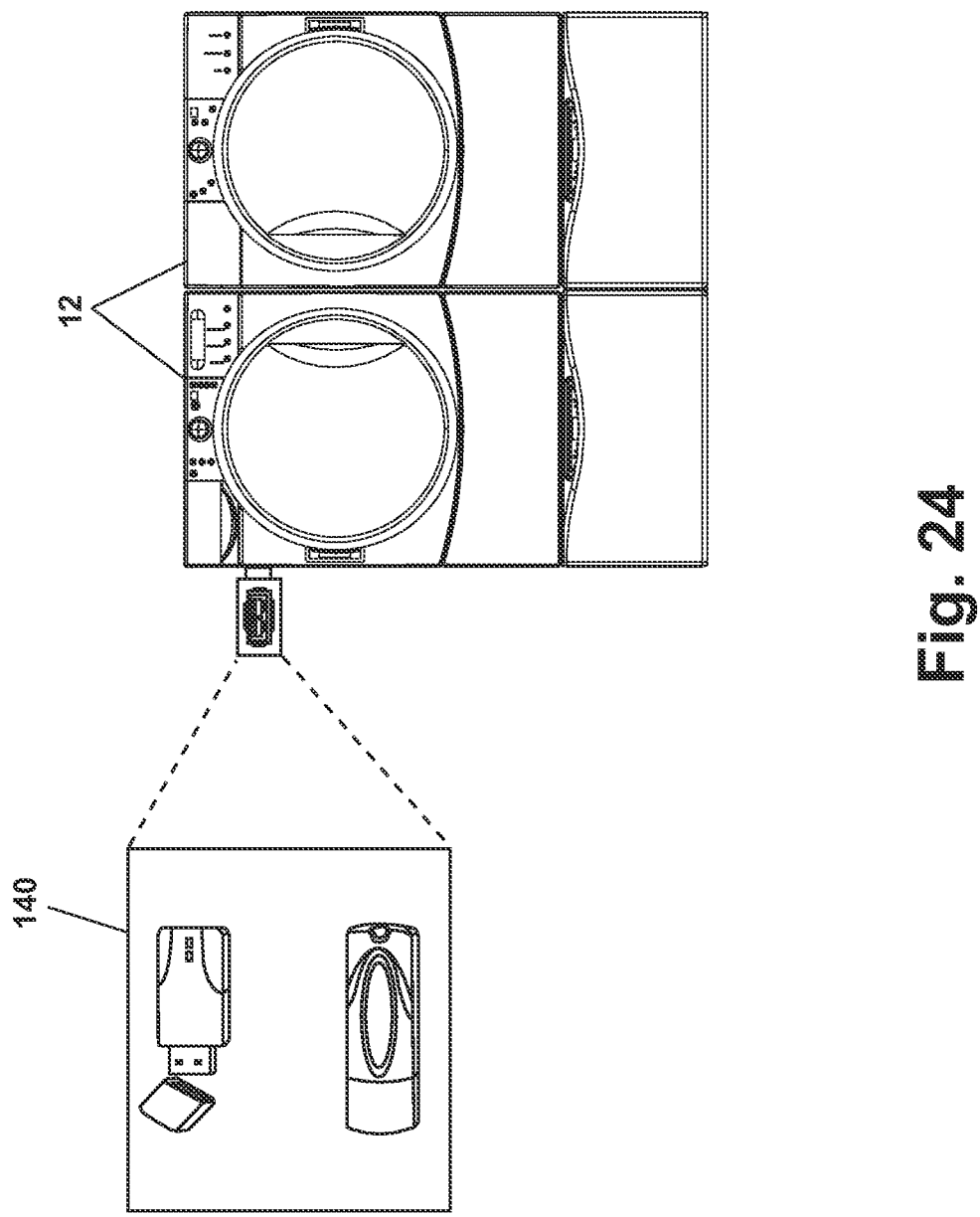
FIG. 24 is a schematic view of a sales demo accessory according to one embodiment of the invention for use with a communicating appliance.

Another example of an accessory is a sales demo accessory. As shown by example in FIG. 24, the sales demo accessory 140 can be a portable device, such as a dongle, that can removably couple with the appliance 12 on display at a retail store. The sales demo accessory 140 can store sales demos that can be executed by the appliance 12. The sales demos can control the appliance 12, highlight certain features of the appliance 12 for the customer, and can be interactive with the customer. Examples of the sales demos include, but are not limited to, displaying promotions on a user interface, user interface light and sound shows, voice feedback combined with user interface key presses, voice command and control, video playback combined with user interface key presses, motion sensing, and mechanical system custom demonstrations. When the software architecture enables control of individual components of the appliance 12, the sales demo can take advantage of this capability and combine the control of the components with external electronics and customization, thereby motivating the customer to interact with the appliance 12. The sales demo mode can be implemented by placing the appliance into a development state using the software architecture.

The sales demos can be downloaded to the sales demo accessory 140 from a web site associated with the manufacturer of the appliance 12 and updated periodically to reflect current marketing strategies of the manufacturer of the appliance 12. By differentiating the appliance 12 from other appliances on display in the retail store, the sales demos can help improve sales of the appliance 12. The sales demos can be customized according to the retail store and trade partners of the manufacturer of the appliance 12. Furthermore, by locating the sales demos on the sales demo accessory 140, code for sales demos that would traditionally reside on the appliance 12 can be removed from the appliance 12, thereby reducing development time and cost of the appliance 12.

Figure 25:
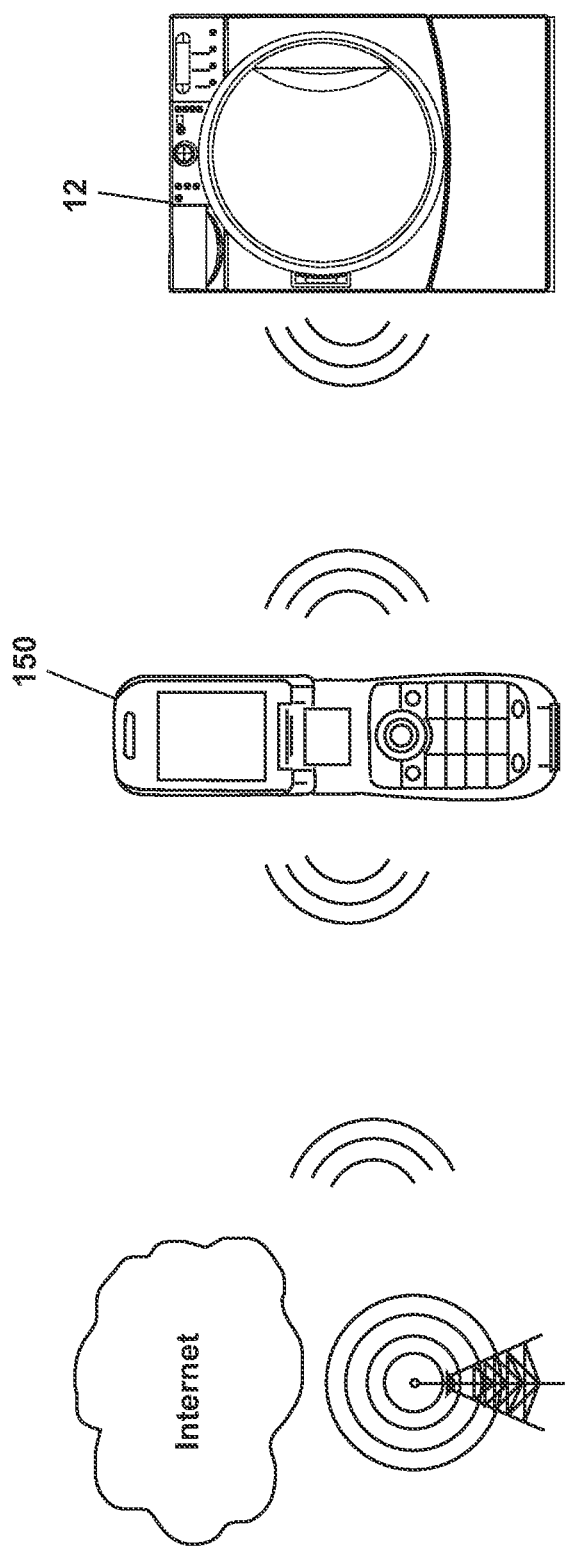
FIG. 25 is a schematic view of a cellular phone according to one embodiment of the invention for use with a communicating appliance.

Another example of an accessory is a cellular phone, which can be used for communication with the appliance 12. In general, today's cellular phones have several integrated technologies, including networking capabilities (Including Bluetooth), Internet connection capabilities, color user interfaces, premium sound, voice recognition capabilities for automatic dialing, and tactile feedback (e.g., vibration), and these integrated technologies can be utilized in conjunction with the appliance 12. Referring to FIG. 25, the cellular phone 150 can communicate with the appliance 12 via Bluetooth or an external connector, such as a USB connector. The cellular phone 150 can also communicate via the Internet. Thus, the cellular phone 150 can download information from the Internet and communicate the downloaded information to the appliance 12 and, conversely, receive information from the appliance 12 and upload the information to the Internet. The information can be any type of information related to the appliance 12, such as applications, custom tests, custom audio, diagnostic data, and customer data.

Examples of using the cellular phone include, but are not limited to, remote diagnostics and service, interactive audio, voice control, and enhanced user interface. For remote diagnostics and service, the cellular phone discovers the appliance and downloads diagnostic tests from the Internet. The cellular phone can locally execute the diagnostic tests through the software architecture and Bluetooth (or other communication means). After the diagnostic tests are complete, the cellular phone can upload testing results to the Internet for diagnosis. For interactive audio, the cellular phone discovers the appliance and downloads custom audio files from the Internet. The cellular phone can register with the appliance for key status events through the software architecture and Bluetooth (or other communication means). When the key events occur on the appliance, the cellular phone can automatically play the appropriate audio file to provide enhanced feedback. For voice control, the user can input voice commands into the cellular phone, and the cellular phone can convert the voice command to a command for the software architecture and transmit the command over Bluetooth (or other communication means). Finally, for the enhanced user interface, a user interface application, which can be downloaded from the Internet, can be executed on the cellular phone. The user interface application can take advantage of the color user interface, the premium sound, and the tactile feedback on the cellular phone. The control of the appliance 12 via the enhanced user interface and feedback from the appliance 12 to the enhanced user interface can occur locally through the software architecture and Bluetooth (or other communication means).

Another example of an accessory is an audio communication accessory. The audio communication accessory is a device that communicates with the appliance or other component on the network having a traditionally visual user interface and adds audio capabilities to the user interface. The audio communication accessory can also be used with any appliances or other component on the network that does not have a user interface. By incorporating the audio communication accessory, the appliance or other component on the network can audibly communicate information related to the appliance or other component to the user, and, optionally, the user can audibly communicate commands and the like to the appliance or other component through the audio communication accessory. Audible communication can be especially beneficial to users having a physical disability, such as blindness or mobility issues where it is difficult for the user to move within visual range of the appliance or other component. The audible communication can be voice (i.e., speaking) or a variety of sounds, such as beeping, alarms, Morse code, songs, etc.

Figure 26:
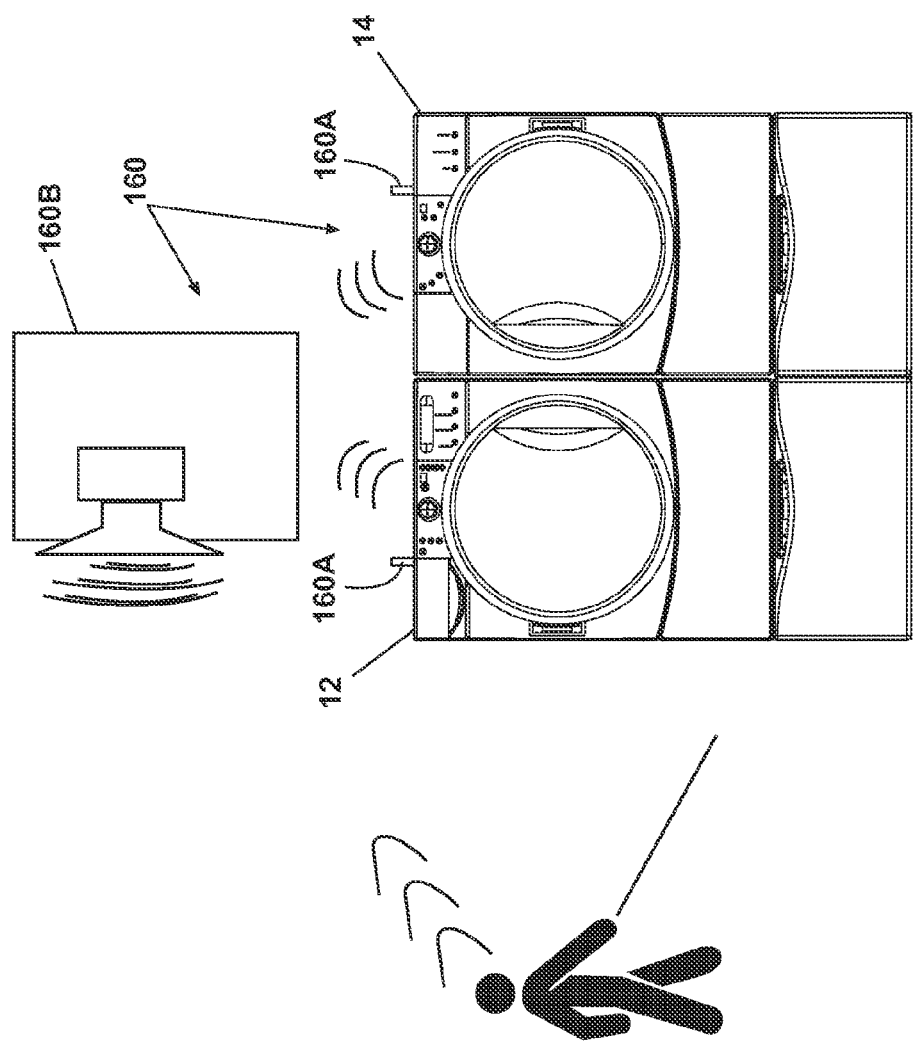
FIG. 26 is a schematic view of an audio communication accessory according to one embodiment of the invention for use with a communicating appliance.

Referring to FIG. 26, the audio communication accessory 160 can be directly mounted to the appliance 12, 14, as shown at 160A or can be separate or remote from the appliance 12, 14 as shown at 160B. In the latter case, the remote audio communication accessory 160B can be located in the home at a convenient location for the user. In one embodiment, the audio communication accessory 160A mounted to the appliance 12, 14 can communicate with the remote audio communication accessory 160B so that the audible information is communicated at more than one location. It is also contemplated that the audio communication accessory 160 can communicate with other audio devices, such as a telephone, a stereo system, a clock radio, and a cellular phone, so that the information can be communicated audibly through the audio device and increase the likelihood that the user will hear the information.

Examples of the information communicated by the audio communication accessory to the user can include, but are not limited to, notifications concerning an operational status of the appliance or other component, such as fireplace on, security system activated, carbon monoxide alarm activated, appliance door open, temperature limits exceeded, leakage, filter requires changing, end of operation cycle, cooktop burner on, oven pre-heat complete, fabric/dish washing complete, water temperature, circuit breaker blown, energy usage status, and energy usage exceeds preprogrammed limit. Examples of the information communicated from the user to the audio communication accessory can include, but are not limited to, commands concerning an operational status of the appliance or other component, such as call or otherwise contact emergency personnel, turn on outdoor spa, turn on outdoor sprinkler system, extend dryer operation cycle, and initiate operation cycle.

Other examples of utilizing the audio communication accessory follow. In one embodiment, the audio communication accessory can be used as an event calendar where the user can record an event, such as a reminder to take medicine, and the audio communication accessory can play the reminder at the appropriate time. As another example, the audio communication accessory can communicate with a source of weather information, such as via the Internet, and notify the user of weather conditions on demand or at preprogrammed times. It is also contemplated that the audio communication accessory can be used in conjunction with tracking devices to locate items in the home. For example, a set of keys can be equipped with the tracking device, and the audio communication accessory can communicate to the user the location of keys when the user cannot find the keys. The audio communication accessory can also be employed as an intercom system where multiple users can communicate with one another through the audio communication accessory. In this scenario, the users can each have the audio communication accessory, or the single audio communication accessory can interface with another device to enable two-way communication. In another embodiment, the audio communication accessory can be used to place the appliances or other components on the network in a "sleep mode," which can include, for example, shutting off lights, lower heating temperature, and activating the security system, when the user provides a sleep mode command as the user is going to bed. As another example, the audio communication accessory can be used in conjunction with the sales demo accessory described above to audibly enhance the sales demos for the appliance. The customer could effectively talk to the appliance and vice-versa, thereby improving the customer interaction with the appliance at the retail store. It is also contemplated that the audio communication accessory can be used in conjunction with an outdoor audio system and/or outdoor camera whereby the user can audibly communicate with a person who has activated a doorbell and/or view, such as via a display on a cellular phone, images of the person who has activated the doorbell. As another example, the audio communication accessory can communicate with a computing device or telephone system and notify the user when the user has received new electronic mail messages and voice mail messages.

The audio communication accessory can also be used to implement an audible use and care guide associated with the appliance. The audible use and care guide can be considered a replacement or addition to a conventional user manual that a user must read. Listening to the audible user and care guide can be more convenient, more efficient, and more easily understood than reading the conventional user manual. The audible use and care guide can include content traditionally included in the conventional user manual, such as explanations of the operational cycles and/or features of the appliance, troubleshooting information, and recommendations for care of different types of items used in the appliance (e.g., laundry, dishes, foods). As an improvement, the audible use and care guide can be configured to communicate information related to operation cycles selected in real-time by the user. Thus, as the operation cycle is being selected by the user, the audible use and care guide can inform the user, for example, how to use the operation cycle, what the operation cycle is meant for, what options are available for the operation cycle, and steps for programming the operation cycle.

The audible use and care guide can be activated prior to using the appliance for the first time or at any time the user requires assistance. In one embodiment, the audible use and care guide can be always accessible and activated by the user actuating a button on the appliance or voice activation via the audio communication accessory. The user can optionally interact with the audible use and care guide, such as by asking questions or instructing the audible use and care guide to skip information not needed by the user. According to one embodiment, the audible use and care guide can implement multiple, selectable modes for various use scenarios, such as whether the appliance is on the floor of a retail store as a sales demo, for a new appliance in the home, for a new user, or for an experienced user. The amount of information and level of detail in the information provided to the user can depend on the experience of the user. The audible use and care guide can be disabled if it becomes annoying or can be reconfigured.

The audio communication accessory can optionally include tactile feedback, such as vibration, which can be especially useful for users having a hearing disability. The tactile feedback can be used in conjunction with or as an alternative to the audio communication. The user can wear or carry a portable device that provides the tactile feedback.

Regardless of the type of accessory, the software architecture can be configured such that the accessory must present electronic credentials (i.e., authentication) before communicating with the appliance. Requiring the electronic credentials prevents unauthorized communication between the accessory and the appliance, thereby avoiding undesirable control of the appliance by the accessory.

Figure 27:
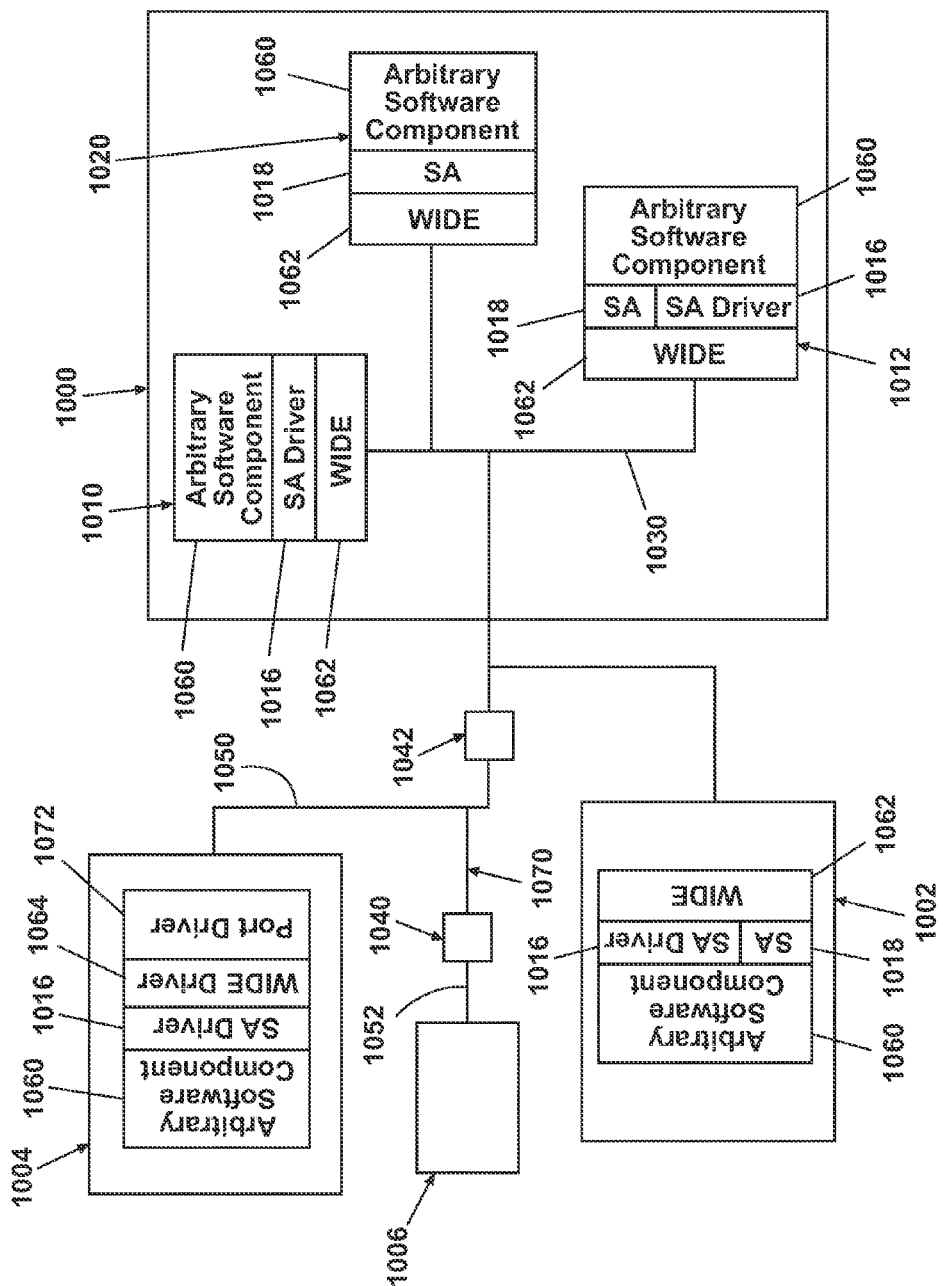
FIG. 27 is a schematic view of a network of appliances and clients connected on multiple networks by couplers.

FIG. 27 illustrates an appliance 1000 connected to external clients 1002, 1004 and a second appliance 1006 by a plurality of networks. A first network 1030 comprises a first internal client 1010, a second internal client 1012 and the external client 1002. A second network 1050 comprises the external client 1004. And a third network 1052 comprises the second appliance 1006. Each client is characterized as a node on the respective network. Local clients are clients that communicate with nodes on the same network. Remote clients are clients not directly coupled to the same network as the node to which they are communicating. In this embodiment, external client 1004 would be a remote client of the nodes on the first network 1030.

Each client node 1002, 1004, 1010, 1012 comprises a software architecture driver (SA driver) 1016 for exchanging messages with any node having a software architecture (SA) 1018 thereon. The nodes on any given network are in operable communication with the other nodes in that network and are optionally in communication with the nodes present on other networks.

The appliance 1000 further comprises at least one node 1020 having the SA thereon. The second appliance 1006 will also likely have a node with the SA on it, and may have one or more clients as well. The first network 1030 also comprises the node 1020.

Couplers 1040, 1042 are special devices that connect to the appliance and/or to a network and/or to two or more networks and communicate therebetween. Each coupler can comprise all the functionality of a node, and each node can comprise all of the functionality of a coupler. In this embodiment, the coupler 1040 couples the second network 1050 to the third network 1052, and can function as a node on each network. The coupler 1042 couples the second network 1050 to the first network 1030. It could also be considered as coupled to the appliance 1000.

Either of the couplers 1040, 1042 can propagate discovery messages issued by the SA or an SA driver across the networks in order to enable the SA and SA drivers or their coupled arbitrary software components to develop references to identifiers of functionality for the different nodes. Each coupler 1040, 1042 can have a routing table stored in a memory for enabling communication between nodes on different networks. The memory can also store identifiers identifying the functionality of each node. The identifiers can be linked to the routing information held within the routing tables so that when a message comprising an identifier is sent to either of the couplers 1040, 1042, the coupler receiving the message can send the message to the appropriate next node.

Each node can comprise a unique combination of software elements. The software elements on any given node include at least one of the SA and an SA driver. The SA driver enables a node to communicate with the SA. The SA inherently includes an SA driver or a variant of the SA Driver. Each node comprising the SA can communicate with other nodes comprising the SA. However, a node can have both the SA and separate SA driver thereon. Each node must also include a suitable communication protocol or communication protocol driver for the respective network type to which it is coupled. An exemplary protocol is the WIDE network protocol 1062, a proprietary appliance network protocol utilized by Whirlpool Corporation. For a client not having WIDE network protocol that needs to communicate WIDE messages (e.g., external client 1004), a WIDE driver 1064 can be used. A port driver 1072 couples the external client 1004 to the network 1050.

Each node can also comprise an arbitrary software component 1060. The couplers 1040, 1042, for example, may not. The SA driver 1016 is a software element configured to allow an arbitrary software component to communicate with the SA 1018 over at least one network. An arbitrary software component is any software component or subcomponent that performs a useful function. Examples include, but are not limited to, a communication driver, an application, a user interface, a control algorithm, message routing, a control for an operational cycle, message handling, data storage, data transformation, data referencing, and software that instructs other software. The SA driver 1016 can receive and at least partially interpret messages from the SA and/or from another SA driver, which are specified as feedback events. In some instances, the SA driver 1016 can also send command messages to the SA 1018. In this respect, the external clients 1002, 1004 can have full capability act as an accessory to communicate with and to enhance or alter the operation of the appliance.

It will be understood that any or all of the external clients 1002, 1004, the couplers 1040, 1042, and the internal clients 1010, 1012 can be physical devices that have a processor, a memory, software, circuitry, and some source of power. In the general sense, they are coupled to transmission media and are preferably configured to take information from the memory and with the processor and the circuitry, produce a signal representing that information in the transmission media. When the information includes an identifier in memory, the node or client is discoverable by other nodes connected via the transmission media.

Discovery is a process by which a first node in communication with at least one coupled network sends discovery messages to the network or networks. Discovery messages generally comprise at least some query information specifying what the sender of the discovery message seeks. The information sought can be information such as another node, an appliance, a client, an arbitrary software component, a device comprising a node, a coupler, or one or more of a plurality of software elements on any node.

A discovery confirmation message is a reply message sent to the sender of a discovery message. Discovery reply messages typically comprise confirmation information and identification information. The confirmation information is an acknowledgment in the form of a positive or a negative response. The identification information is information enabling the sender to send subsequent messages to that which has been discovered.

Where more than one network is connected by a coupler, such as couplers 1040, 1042, a message received by the coupler from one network can be propagated and sent to the second network. The coupler may create a second separate message with the same information compatible for a second network, but together, the first and the second messages are considered a single propagated message, even though they may be literally two messages. A propagated discovery message, then, is a discovery message that is propagated to a receiver. A coupler may be configured to inspect propagated messages to prevent propagation of a circular message, i.e, a sent message that is also unknowingly received by the sender on a second network to which the sender is coupled. At least the coupler 1040 may have a routing table including proxy identifiers of the functionalities of the second node. As well, the coupler 1042 may have a routing table including proxy identifiers. A discovery message sent by the node 1020 is received by the coupler 1042, which evaluates the message in accord with the routing table and propagates the message to the next node, coupler 1040. Similarly, the coupler 1040, evaluates the propagated message in light of the routing table, and propagates the message to the next node in line, which may be the second node.

Figure 28:
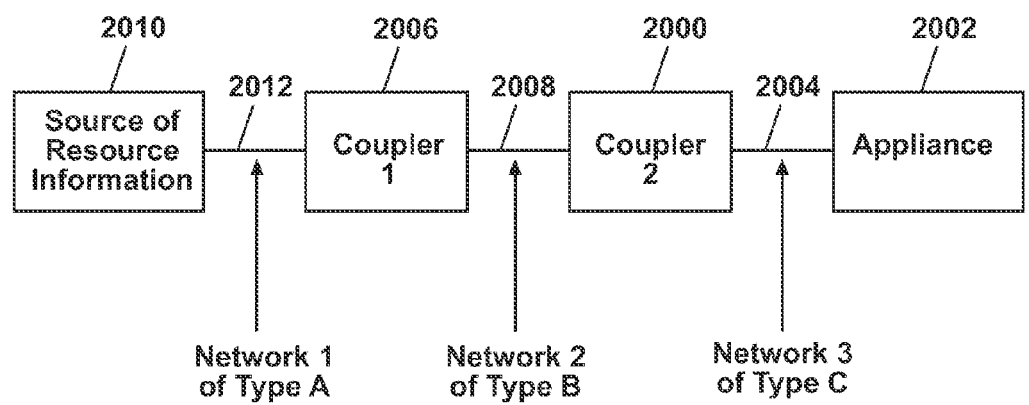
FIG. 28 is a schematic view of a source of information about resources connected to an appliance through two couplers.

See, for example, FIG. 28 illustrating a system where resources in an appliance can be monitored, managed, or changed as in the energy controller accessory of FIG. 13. A likely scenario has a coupler 2000 connected to an appliance 2002 by a network 2004. The coupler 2000 also connects to a coupler 2006 via network 2008 that may be a different type of network from network 2004. Coupler 2006 connects to a source 2010 of information about resources used or generated by the appliance 2002 by a third network 2012 that may be a different type of network from either network 2004 or network 2008. Assume that the source 2010 wants to send information about the resource to the appliance 2002. The invention enables a node in the source 2010 on network 2012 to communicate with a second node, having SA for example, which may be among several on the appliance 2002. We assume that the source 2010 has at least an appropriate communication driver, or one of the couplers has software to translate any message from the source to the communication protocols of the incorporated PCT/US2006/022420, for example.

In this scenario, the source 2010 sends a discovery message over the network 2012 seeking any consumer of resources to which the source wants to send information. The coupler 2006 receives the discovery message, translates the message, if necessary, and propagates the discovery message to the next nodes over the network 2008, including coupler 2000. Coupler 2000 receives the discovery message, translates the message, if necessary, and propagates the discovery message to the next nodes over the network, including the appliance 2002. The relevant nodes in the appliance 2002 evaluate the message and determine a discovery reply message, and send respective replies. Here, we assume at least one reply is positive.

The discovery reply message is received by the coupler 2000, which populates its routing table and sends it to the coupler 2006, which populates its routing table and sends it to the source 2010 in accord with the foregoing process. Each node retains the relevant identifiers so that subsequent message can be communicated without repeating the discovery sequence. As well, those nodes with memory, such as the couplers, can be configured to save messages.

With this structure, a source of information about a resource such as electricity, hot water, gray water, gas, water, replaceable parts, or other consumables, can request a change in the operation of the appliance based on the information. For example, if an electric utility is facing a brownout, a source of information about the electricity can request that an electric dryer not commence an operation for a period of time. Similarly, a source of consumables, such as filters or spare parts, can ascertain from an appliance the status of the consumable and send information about the timing and availability of replacement.

While the invention has been specifically described in connection with certain specific embodiments thereof, it is to be understood that this is by way of illustration and not of limitation, and the scope of the appended claims should be construed as broadly as the prior art will permit.

What is claimed is:

1. A network binder accessory to bind a first node to at least one other node in a private network apart from any existing network to which the first and at least one other nodes may belong, the network binder accessory comprising:
   a processor, memory, and a power source to energize the processor and the memory;
   a wireless transmitter/receiver of limited transmission range in communication with the processor and memory; and
   an actuator to actuate the wireless transmitter/receiver, with the processor and memory in communication with a node by way of the wireless transmitter/receiver only when the node is within the limited transmission range of the actuated wireless transmitter/receiver;

wherein the network binder accessory is external to the first and at least one other nodes, and wherein upon actuation of the actuator when the first node is within the limited transmission range of the wireless transmitter/receiver, the network binder accessory recognizes any existing network identifiers associated with the first node, the processor and memory operate to establish a new private network identifier, apart from any existing network identifiers, and the new private network identifier is communicated with and assigned to the first node via the wireless transmitter/receiver, and upon actuation of the actuator when the at least one other node is later within the limited transmission range of the wireless transmitter/receiver, the wireless transmitter/receiver transmits the new private network identifier to the at least one other node to bind the first and at least one other nodes to each other using the new private network identifier, to establish the private network comprising the first and at least one other nodes apart from any existing network to which the first and at least one other nodes may belong.

2. The network binder accessory of claim 1 wherein the network binder accessory is configured to communicate with a personal computer.

3. The network binder accessory of claim 1 wherein the new private network identifier is stored in the memory.

4. The network binder accessory of claim 1 comprising a visual indicator to indicate the existence of a communicable node.

5. The network binder accessory of claim 1 comprising a graphical interface to display information from a node.

6. The network binder accessory of claim 5 wherein the information comprises one of a plurality of existing network identifiers on which a node is currently connected, the addresses of a node on a plurality of networks, where each network is identified by its own network identifier, a plurality of user-friendly names of a node on the plurality of networks, and identification and information about networks that the network binder has thus far configured, including the nodes for each network and relevant information about each.

7. The network binder accessory of claim 5 comprising a navigation button to enable scrolling if the information is too much to display on a single screen.

\* \* \* \* \*